United States Patent
Foo et al.

(10) Patent No.: US 9,306,879 B2
(45) Date of Patent: Apr. 5, 2016

(54) MESSAGE-BASED IDENTIFICATION OF AN ELECTRONIC DEVICE

(71) Applicant: Apple Inc., Cupertino, CA (US)

(72) Inventors: Edwin W. Foo, San Mateo, CA (US);
Shailesh Rathi, San Jose, CA (US);
Jason J. Yew, San Jose, CA (US);
Gregory T. Lydon, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 13/710,084

(22) Filed: Dec. 10, 2012

(65) Prior Publication Data

US 2013/0332542 A1    Dec. 12, 2013

Related U.S. Application Data

(60) Provisional application No. 61/657,586, filed on Jun. 8, 2012.

(51) Int. Cl.
| | | |
|---|---|---|
| *G06F 15/16* | (2006.01) | |
| *H04L 12/58* | (2006.01) | |
| *G06F 13/38* | (2006.01) | |

(52) U.S. Cl.
CPC .............. *H04L 51/04* (2013.01); *G06F 13/385* (2013.01); *G06F 13/387* (2013.01)

(58) Field of Classification Search
CPC ..... H04L 69/24; G06F 13/385; G06F 13/387; G06F 51/04
USPC .................................................. 709/230, 232
See application file for complete search history.

(56) References Cited

U.S. PATENT DOCUMENTS

| | | |
|---|---|---|
| 4,850,899 A | 7/1989 | Maynard |
| 4,916,334 A | 4/1990 | Minagawa et al. |
| 4,924,216 A | 5/1990 | Leung |
| 4,938,483 A | 7/1990 | Yavetz |

(Continued)

FOREIGN PATENT DOCUMENTS

| | | |
|---|---|---|
| EP | 1104150 | 5/2001 |
| EP | 1498899 | 1/2005 |

(Continued)

OTHER PUBLICATIONS

International Search Report and Written Opinion mailed Jul. 24, 2013 in PCT/US2013/039335, 11 pages.

(Continued)

*Primary Examiner* — Jonathan Bui
(74) *Attorney, Agent, or Firm* — Kilpatrick Townsend & Stockton LLP

(57) ABSTRACT

A message-based identification process can facilitate reliable interoperation between accessories and host devices. During an identification process, the devices can negotiate an operating agreement that specifies particular communications (e.g., messages) that each device is permitted to send to or receive from the other, for example by having one device send a list of specific messages that it intends to send to and/or receive from the other. The other device can review the proposal and either accept or reject it. If a proposal is accepted, the devices can begin interoperating using messages that were included in the agreed-upon proposal while ignoring any received messages that were not included in the agreed-upon proposal.

25 Claims, 6 Drawing Sheets

(56) References Cited

U.S. PATENT DOCUMENTS

| | | | |
|---|---|---|---|
| 5,142,528 A * | 8/1992 | Kobayashi et al. | 370/469 |
| 5,247,138 A | 9/1993 | Landmeier | |
| 5,475,836 A | 12/1995 | Harris et al. | |
| 5,525,981 A | 6/1996 | Abernethy | |
| 5,618,045 A | 4/1997 | Kagan et al. | |
| 5,732,361 A | 3/1998 | Liu | |
| 5,835,862 A | 11/1998 | Nykanen et al. | |
| 5,859,522 A | 1/1999 | Theobald | |
| 5,964,847 A | 10/1999 | Booth, III et al. | |
| 6,012,105 A | 1/2000 | Rubbmark et al. | |
| 6,078,402 A | 6/2000 | Fischer et al. | |
| 6,078,789 A | 6/2000 | Bodenmann et al. | |
| 6,101,393 A | 8/2000 | Alperovich | |
| 6,154,798 A | 11/2000 | Lin et al. | |
| 6,161,027 A | 12/2000 | Poirel | |
| 6,188,265 B1 | 2/2001 | Liu et al. | |
| 6,397,261 B1 | 5/2002 | Eldridge et al. | |
| 6,421,716 B1 | 7/2002 | Eldridge et al. | |
| 6,452,924 B1 | 9/2002 | Golden et al. | |
| 6,453,371 B1 | 9/2002 | Hampson et al. | |
| 6,463,473 B1 | 10/2002 | Gubbi | |
| 6,487,189 B1 | 11/2002 | Eldridge et al. | |
| 6,493,760 B1 | 12/2002 | Pendlebury et al. | |
| 6,526,287 B1 | 2/2003 | Lee | |
| 6,601,102 B2 | 7/2003 | Eldridge et al. | |
| 6,608,399 B2 | 8/2003 | McConnell et al. | |
| 6,665,803 B2 | 12/2003 | Lunsford et al. | |
| 6,724,339 B2 | 4/2004 | Conway et al. | |
| 6,725,061 B1 | 4/2004 | Hutchison, IV et al. | |
| 6,859,538 B1 | 2/2005 | Voltz | |
| 6,928,295 B2 | 8/2005 | Olson et al. | |
| 6,931,266 B2 | 8/2005 | Miyoshi et al. | |
| 6,934,752 B1 | 8/2005 | Gubbi | |
| 7,050,783 B2 | 5/2006 | Curtiss et al. | |
| 7,062,261 B2 | 6/2006 | Goldstein et al. | |
| 7,127,678 B2 | 10/2006 | Bhesania et al. | |
| 7,167,935 B2 | 1/2007 | Hellberg | |
| 7,187,947 B1 | 3/2007 | White et al. | |
| 7,187,948 B2 | 3/2007 | Alden | |
| 7,215,042 B2 | 5/2007 | Yan | |
| 7,254,708 B2 | 8/2007 | Silvester | |
| 7,284,059 B2 | 10/2007 | Isozu | |
| 7,293,122 B1 | 11/2007 | Schubert et al. | |
| 7,299,304 B2 | 11/2007 | Saint-Hilaire et al. | |
| 7,305,254 B2 | 12/2007 | Findikli | |
| 7,305,506 B1 | 12/2007 | Lydon et al. | |
| 7,363,045 B2 | 4/2008 | Rogalski et al. | |
| 7,441,062 B2 | 10/2008 | Novotney et al. | |
| 7,466,659 B1 * | 12/2008 | Kazar et al. | 370/252 |
| 7,529,870 B1 | 5/2009 | Schubert et al. | |
| 7,667,715 B2 | 2/2010 | MacInnis et al. | |
| 7,813,492 B2 * | 10/2010 | Kauhanen et al. | 379/229 |
| RE42,702 E | 9/2011 | Cobb | |
| 2001/0005641 A1 | 6/2001 | Matsumoto et al. | |
| 2001/0006884 A1 | 7/2001 | Matsumoto | |
| 2002/0002035 A1 | 1/2002 | Sim et al. | |
| 2002/0029303 A1 | 3/2002 | Nguyen | |
| 2002/0065074 A1 | 5/2002 | Cohn et al. | |
| 2002/0068610 A1 | 6/2002 | Anvekar et al. | |
| 2002/0072390 A1 | 6/2002 | Uchiyama | |
| 2002/0095570 A1 | 7/2002 | Eldridge et al. | |
| 2002/0103008 A1 | 8/2002 | Rahn et al. | |
| 2002/0105861 A1 | 8/2002 | Leapman | |
| 2002/0115480 A1 | 8/2002 | Huang | |
| 2002/0132651 A1 | 9/2002 | Jinnouchi | |
| 2002/0151327 A1 | 10/2002 | Levitt | |
| 2002/0152874 A1 | 10/2002 | Vilcauskas et al. | |
| 2002/0156546 A1 | 10/2002 | Ramaswamy | |
| 2002/0156949 A1 | 10/2002 | Kubo et al. | |
| 2002/0173273 A1 | 11/2002 | Spurgat et al. | |
| 2002/0174269 A1 | 11/2002 | Spurgat et al. | |
| 2002/0194621 A1 | 12/2002 | Tran et al. | |
| 2003/0004934 A1 | 1/2003 | Qian | |
| 2003/0041206 A1 | 2/2003 | Dickie | |
| 2003/0059022 A1 | 3/2003 | Nebiker et al. | |
| 2003/0073432 A1 | 4/2003 | Meade | |
| 2003/0079038 A1 | 4/2003 | Robbin et al. | |
| 2003/0090998 A1 | 5/2003 | Lee et al. | |
| 2003/0118049 A1 * | 6/2003 | Bender et al. | 370/466 |
| 2003/0133494 A1 * | 7/2003 | Bender et al. | 375/130 |
| 2003/0185395 A1 | 10/2003 | Lee et al. | |
| 2003/0208750 A1 | 11/2003 | Tapper et al. | |
| 2003/0220988 A1 | 11/2003 | Hymel | |
| 2004/0048569 A1 | 3/2004 | Kawamura | |
| 2004/0103223 A1 | 5/2004 | Gabehart et al. | |
| 2004/0116005 A1 | 6/2004 | Choi | |
| 2004/0139095 A1 * | 7/2004 | Trastour et al. | 707/100 |
| 2004/0162029 A1 | 8/2004 | Grady | |
| 2004/0164708 A1 | 8/2004 | Veselic et al. | |
| 2004/0186935 A1 | 9/2004 | Bell et al. | |
| 2004/0194154 A1 | 9/2004 | Meadors et al. | |
| 2004/0224638 A1 | 11/2004 | Fadell et al. | |
| 2004/0249994 A1 | 12/2004 | Shapiro et al. | |
| 2004/0267812 A1 | 12/2004 | Harris et al. | |
| 2005/0014531 A1 | 1/2005 | Findikli | |
| 2005/0022212 A1 | 1/2005 | Bowen | |
| 2005/0066009 A1 | 3/2005 | Keohane et al. | |
| 2005/0097087 A1 | 5/2005 | Punaganti Venkata et al. | |
| 2005/0135790 A1 | 6/2005 | Hutten | |
| 2005/0149213 A1 | 7/2005 | Guzak et al. | |
| 2005/0181756 A1 | 8/2005 | Lin | |
| 2005/0195738 A1 | 9/2005 | Datla et al. | |
| 2005/0207726 A1 | 9/2005 | Chen | |
| 2006/0013217 A1 | 1/2006 | Datla et al. | |
| 2006/0088228 A1 | 4/2006 | Marriott et al. | |
| 2006/0101146 A1 | 5/2006 | Wang | |
| 2006/0156415 A1 | 7/2006 | Rubinstein et al. | |
| 2006/0161621 A1 | 7/2006 | Rosenberg | |
| 2006/0184456 A1 | 8/2006 | de Janasz | |
| 2006/0247851 A1 | 11/2006 | Morris | |
| 2006/0258289 A1 | 11/2006 | Dua | |
| 2007/0056013 A1 | 3/2007 | Duncan | |
| 2007/0080823 A1 | 4/2007 | Fu et al. | |
| 2007/0086724 A1 | 4/2007 | Grady et al. | |
| 2007/0173294 A1 | 7/2007 | Hsiung | |
| 2007/0226384 A1 | 9/2007 | Robbin et al. | |
| 2007/0236482 A1 | 10/2007 | Proctor et al. | |
| 2007/0271387 A1 | 11/2007 | Lydon et al. | |
| 2007/0294445 A1 | 12/2007 | Jang et al. | |
| 2007/0300155 A1 | 12/2007 | Laefer et al. | |
| 2008/0080703 A1 | 4/2008 | Penning et al. | |
| 2008/0188209 A1 | 8/2008 | Dorogusker et al. | |
| 2008/0256205 A1 | 10/2008 | Mahoney | |
| 2008/0291905 A1 | 11/2008 | Chakravadhanula et al. | |
| 2008/0313704 A1 | 12/2008 | Sivaprasad | |
| 2009/0055510 A1 | 2/2009 | Svendsen | |
| 2009/0138948 A1 | 5/2009 | Calamera et al. | |
| 2009/0168786 A1 | 7/2009 | Sarkar et al. | |
| 2009/0182881 A1 | 7/2009 | Huang et al. | |
| 2009/0231415 A1 | 9/2009 | Moore et al. | |
| 2009/0257456 A1 * | 10/2009 | Carlson et al. | 370/503 |
| 2009/0265763 A1 | 10/2009 | Davies et al. | |
| 2010/0046732 A1 | 2/2010 | James et al. | |
| 2010/0231352 A1 | 9/2010 | Bolton et al. | |
| 2010/0233961 A1 * | 9/2010 | Holden et al. | 455/41.3 |
| 2010/0234068 A1 | 9/2010 | Bolton et al. | |
| 2010/0235550 A1 * | 9/2010 | Bolton et al. | 710/62 |
| 2011/0164533 A1 | 7/2011 | Krumel | |
| 2011/0167176 A1 | 7/2011 | Yew et al. | |
| 2011/0302347 A1 | 12/2011 | Schubert et al. | |
| 2012/0052807 A1 | 3/2012 | Rathi et al. | |
| 2013/0332632 A1 | 12/2013 | Rathi et al. | |

FOREIGN PATENT DOCUMENTS

| | | |
|---|---|---|
| EP | 1594319 | 11/2005 |
| EP | 1672613 | 6/2006 |
| EP | 2230605 A1 | 9/2010 |
| JP | 2000-214953 | 8/2000 |
| TW | 2008/34329 A | 8/2008 |
| TW | 2009/37198 A | 9/2009 |
| WO | 00/42797 A1 | 7/2000 |
| WO | 03/036541 | 5/2003 |
| WO | 03/073688 | 9/2003 |

(56) References Cited

FOREIGN PATENT DOCUMENTS

| WO | 2004/084413 | | 9/2004 |
|---|---|---|---|
| WO | 2005/119463 | | 12/2005 |
| WO | 2008/097273 | A1 | 8/2008 |
| WO | 2009/088709 | A2 | 7/2009 |

OTHER PUBLICATIONS

Bluetooth.RTM., "Specification of the Bluetooth System—Architecture & Terminology Overview," Version 2.1 + EDR, 111 pages, Jul. 26, 2007.

Menezes et al., "Handbook of Applied Cryptography," Identification and Entity Authentication, 1997, pp. 385-424.

Sinitsyn, "A Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

"The Authoritative Dictionary of IEEE Standards Terms, Seventh Edition," Published by Standards Information Network, IEEE Press, 2000, 3 pages.

"Universal Serial Bus Specification," Revision 2.0, 147 pages, Apr. 27, 2000.

Vitaliano, "Why FireWire is Hot!Hot!Hot!" downloaded Oct. 16, 2001, "Impact.FireWire.SideBar" http:--www.vxm.com-21R.35.html.

Whittle, "Public Key Authentication Framework: Tutorial," First Principles Consulting, Jun. 2, 1996, downloaded Oct. 6, 2004, http:--www.ozemail.com.au-.about.firstpr-crypto-pkaftute.htm, 7 pages.

International Search Report and Written Opinion mailed Aug. 26, 2013 in PCT/US2013/040734, 13 pages.

Taiwan Office Action mailed on Feb. 10, 2015 for TW Patent Application No. 102118293, with English translation, 12 pages.

* cited by examiner

| INFO ITEM | TYPE | # | UPDATE? |
|---|---|---|---|
| Accessory Name | string | 1 | Yes |
| Accessory Mfr | string | 1 | Yes |
| Accessory Model | string | 1 | Yes |
| Accesory Serial No. | string | 1 | Yes |
| Firmware Version | string | 1 | Yes |
| Hardware Version | string | 1 | Yes |
| Message-Send | array | 1 | No |
| Message-Receive | array | 1 | No |
| App-Protocols | field | 0+ | No |
| Preferred App | string | 0-1 | No |
| Current Language | string | 0-1 | Yes |
| Current Region | string | 0-1 | Yes |
| Supported Language | string | 0+ | No |
| Supported Region | string | 0+ | No |
| Charger Type | enum | 1 | No |
| Max Current Supply | integer | 0-1 | No |
| Max Current Draw | integer | 0-1 | No |
| USB Host Settings | field | 0-1 | Yes |
| USB Device Settings | field | 0-1 | Yes |
| Serial Port Settings | field | 0-1 | Yes |
| Bluetooth Settings | field | 0+ | Yes |
| WiFi Settings | field | 0+ | Yes |

FIG. 5

MESSAGE-BASED IDENTIFICATION OF AN ELECTRONIC DEVICE

CROSS-REFERENCE TO RELATED APPLICATION

This application claims the benefit of U.S. Provisional Application No. 61/657,586, filed Jun. 8, 2012, entitled "Message-Based Identification of an Electronic Device," the entire disclosure of which is incorporated by reference for all purposes.

BACKGROUND

The present disclosure relates in general to communicating data between electronic devices and in particular to message-based identification of one device to another.

Portable electronic devices, such as smart phones, tablet computers, media players, and the like, have become ubiquitous. Various accessories have been created to interoperate with portable electronic devices to extend their functionality and/or enhance the user experience. Examples of accessories include chargers, speaker docks, in-vehicle docks that provide options for controlling the portable device using the vehicle's console, workout equipment, health monitoring accessories (e.g., heart rate, blood pressure or glucose meters), and so on. Accessories can be designed to interoperate with multiple portable electronic devices that may differ in their form factor and capabilities (e.g., processing power; firmware version; battery life, presence or absence of cameras, microphones, or other components).

To provide a reliably pleasant experience for a user operating a portable device in conjunction with an accessory, it can be desirable to verify that the accessory will operate correctly with a particular portable device. However, the sheer variety of possible accessories, as well the number of different portable devices to which a particular accessory can be connected, makes such verification difficult.

SUMMARY

Certain embodiments of the present invention provide a message-based identification process that can facilitate reliable interoperation between accessories and host devices (including portable devices). The process can be executed as part of initializing communication when the accessory connects to a host. During the identification process, the devices can negotiate an operating agreement that specifies particular communications (e.g., messages) that each device is permitted to send to or receive from the other. For example, during identification, the accessory can send to the host device a proposal that identifies a list of specific messages that the accessory intends to send to and/or receive from the host device. The host device can review the proposal and notify the accessory as to whether the proposal is or is not accepted. In some embodiments, if the proposal is not accepted, the accessory can present a new (presumably modified) proposal. Once a proposal has been accepted, the host device and accessory can begin interoperating, which can include sending and/or receiving any of the messages identified in the agreed-upon proposal. In some embodiments, during operation, the host device can prevent the accessory from invoking or using any functionality that was not included in the proposal, e.g., by ignoring messages that were not identified in the agreed-upon proposal; likewise, the accessory can ignore messages received from the host that were not identified in the agreed-upon proposal.

For example, in some embodiments, the host device and the accessory may interoperate by exchanging messages that are defined as part of a finite "universe" of messages belonging to an accessory protocol. This universe can include a set of "general" messages that all accessories and all host devices conforming to the protocol are expected to support and a set of "optional" messages that might or might not be used, depending on the capabilities of the host device and the accessory and on the particular operating agreement negotiated between them. The proposal presented by the accessory can be presented using an identification message, which can be one of the general messages. The identification message can include a list identifying each one of the optional messages that the accessory proposes to be allowed to send to the host and each one of the optional messages that the accessory proposes to receive from the host. (In this example, support for general messages is presumed, and general messages need not be listed.) The host device can determine whether it supports each of the messages included in the proposal. In some embodiments, the host can also determine, e.g., based on an authentication operation and/or on other identifying information provided by the accessory, whether the accessory should be permitted to use each of the messages include in the proposal. Based on its determination, the host device can respond to the proposal. In some embodiments, the response can be either an acceptance or rejection; in the case of a rejection, an indication of the reason for rejection can be provided or not as desired.

If a proposal is rejected, the accessory can have the option to retry with a different proposal. In some embodiments, retrying can include sending a new identification message that supersedes the previous message. The new identification message can include a different list of optional messages to be sent and/or received. For example, the accessory can first propose a set of optional messages that would allow it to optimally perform all of its functions. If the first proposal is not accepted, the accessory can propose a second set of optional messages that would allow it to perform its functions, although possibly in a less than optimal manner, or that would allow it to perform a subset of its functions. The second proposed set of messages can include a subset of the first proposed set and/or additional messages; for instance, a message that was in the first set can be replaced in the second set with one or more other messages that can be used to achieve similar functionality. Once a proposal is accepted, the host device and the accessory can interoperate by exchanging any of the messages on the message list provided by the accessory, as well as any general messages for which support is presumed under the accessory protocol.

In some embodiments, the host device does not limit the number of unsuccessful proposals that an accessory can present; the accessory can present any number of proposals until either a proposal is accepted or the accessory has determined that it does not have a proposal that will be accepted.

Certain aspects of the invention relate to methods for establishing communication between two devices according to a protocol that defines a universe of messages that are sendable by one of the devices to the other device. For example, a first device can send to the second device an identification message that includes a proposal to partition the universe of messages into a set of operative messages and a set of inoperative messages. This proposal can include a listing of at least some of the messages to be included in the set of operative messages. In some embodiments, the listing can be divided into a first list identifying messages the first device proposes to send and a second list identifying messages the first device proposes to receive. In response, the second device can determine whether to accept or reject the proposal and send a message to the first device indicating whether the proposal is accepted or rejected. If the proposal is accepted, the devices can interoperate using some or all of the messages that were included in the set of operative messages defined by the accepted proposal; any messages sent that were not included in the operative set can be ignored by the receiving device. If the proposal is rejected, in some embodiments the first device can send a modified proposal (e.g., a modification to the listing of messages to be included in the set of operative messages). In some embodiments, the second device can limit the number of retries (modified proposals) and/or impose a timeout period for receiving a modified proposal after notifying the first device that a proposal was rejected.

The second device can apply various rules in determining whether to accept or reject the proposal. For example, the identification message sent by the first device can include a device descriptor, which can incorporate information such as a name of a manufacturer of the device, a model name of the device, a serial number of the device, a hardware version identifier, and/or a firmware version identifier. The second device can use descriptive information about the first device to determine whether the proposed set of operative messages should be used with that device. In some embodiments, the second device can receive authentication information from the first device and use that information in determining whether to accept or reject the proposal. Thus, a proposal can be rejected if the authentication information indicates that the first device is not authorized to interoperate with the second device or if the information indicates that the first device is not authorized to use all of the messages in the proposed set of operative messages.

In some embodiments, whether the second device accepts or rejects the proposal can depend in part on whether the second device is capable of recognizing and/or generating all of the messages in the proposed set of operative messages. The determination can also be based on whether the proposed set of operative messages is sufficient to implement a functionality associated with at least one of the messages in the set.

In some embodiments, the device that sends the proposal can be an accessory while the device that accepts or rejects the proposal can be the host. In other embodiments, these roles can be reversed, and a host can send a proposal to the accessory. Control logic for generating and sending proposals and/or for determining whether to accept or reject a received proposal can be implemented in the devices, e.g., by providing suitably programmed processors.

The following detailed description together with the accompanying drawings will provide a better understanding of the nature and advantages of the present invention.

BRIEF DESCRIPTION OF THE DRAWINGS

FIG. 5 is a table listing parameters that can be defined for an identification message according to an embodiment of the present invention.

DETAILED DESCRIPTION

Certain embodiments of the present invention provide a message-based identification process that can facilitate reliable interoperation between accessories and host devices (including portable devices). The process can be executed as part of initializing communication when the accessory connects to a host. During the identification process, the devices can negotiate an operating agreement that specifies particular communications (e.g., messages) that each device is permitted to send to or receive from the other. For example, during identification, the accessory can send to the host device a proposal that identifies a list of specific messages that the accessory intends to send to and/or receive from the host device. The host device can review the proposal and notify the accessory as to whether the proposal is or is not accepted. In some embodiments, if the proposal is not accepted, the accessory can present a new (presumably modified) proposal. Once a proposal has been accepted, the host device and accessory can begin interoperating, which can include sending and/or receiving any of the messages identified in the agreed-upon proposal. In some embodiments, during operation, the host device can prevent the accessory from invoking or using any functionality that was not included in the proposal, e.g., by ignoring messages that were not identified in the agreed-upon proposal; likewise, the accessory can ignore messages received from the host that were not identified in the agreed-upon proposal.

Figure 1:
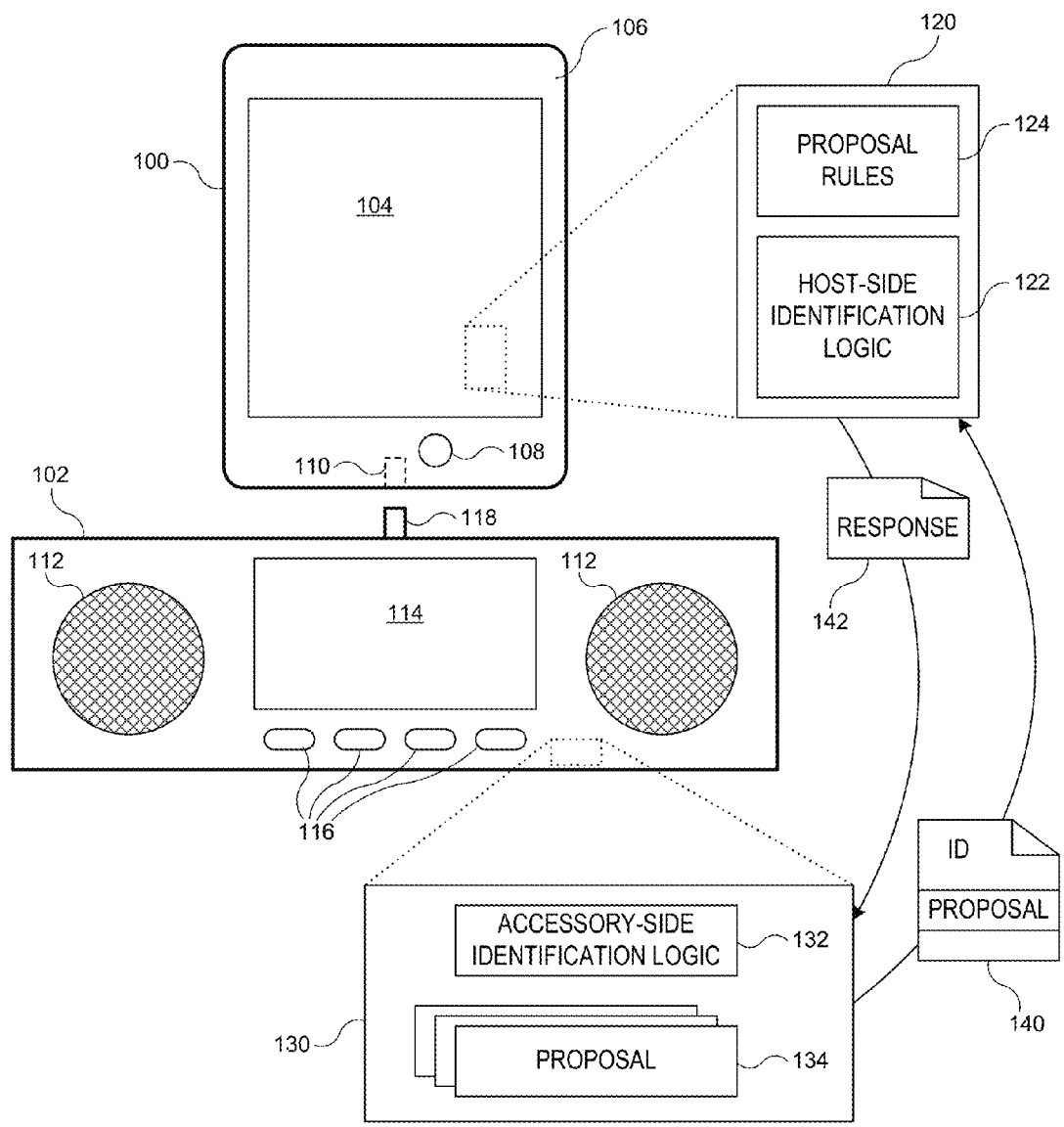
FIG. 1 shows a host device and an accessory according to an embodiment of the present invention.

FIG. 1 shows a host device 100 and an accessory 102 according to an embodiment of the present invention.

Host device 100 can be, for example, a handheld device such as a media player, smart phone, or personal digital assistant; a tablet computer; a laptop computer; a desktop computer; or any other electronic device capable of communicating with other devices. In some embodiments, host device 100 can be a portable device (meaning a device that is easily carried by a user from place to place), but this is not required. In the example shown, host device 100 is a tablet computer with a display area 104 surrounded by bezel 106 and a control button 108. A receptacle connector 110 is provided at the bottom of host device 100 (e.g., recessed into the housing) to allow accessories to connect to host device 100.

Accessory 102 can be any accessory capable of interacting with host device 102, such as a speaker dock or speaker system, a media console, an automobile head unit, or the like. Accessory 102 can have various user-interface components such as speakers 112, display 114, and user-operable controls 116. In the example shown, accessory 102 has a plug connector 118 that can be inserted into receptacle connector 110 to provide electrical and mechanical connections between accessory 102 and host device 100. In some embodiments, the electrical connections can include both power and data connections, allowing accessory 102 to deliver power to host device 100 and/or to receive power from host device 100. While a direct connection between connectors 110 and 118 is indicated, it is to be understood that some embodiments can use an indirect connection, e.g., via a cable or adapter. In some embodiments, host device 100 and accessory 102 may be capable of communicating wirelessly, e.g., using radio-frequency communication technology such as Wi-Fi or Bluetooth, near-field communication technology, infrared communication or the like, in addition to or instead of a wired signal path as provided by connectors 110 and 118. In some embodiments, multiple communication paths can be concurrently established between host device 100 and accessory 102, with different types of information being selectively routed over different paths.

By communicating, e.g., via connectors 110 and 118, host device 100 and accessory 102 can implement various functionalities. For example, in some embodiments, host device 100 can stream media content for presentation by accessory 102 and can provide status information (e.g., information about a currently playing audio track) to accessory 102 for presentation to the user, e.g., on display 114. A user can operate controls 116 of accessory 102 to control playback of the media asset, e.g., play/pause, or selection of a different asset. As another example, accessory 102 can include a radio receiver (not shown) to receive media content, e.g., from FM, AM, or satellite transmitters. Portable device 100 can be used to control operation of the radio receiver, e.g., channel or program selection. Many other types of interoperation are possible.

To facilitate interoperation, host device 100 and accessory 102 can negotiate an operating agreement that defines the functionality they will mutually support. In some embodiments, the agreement is negotiated when host device 100 and accessory 102 establish a connection, and negotiating the agreement can be part of a device identification process.

For example, as shown in inset 130, accessory device 102 can include accessory-side identification logic 132 and one or more proposals 134. Each proposal 134 can include a list of messages that accessory 102 proposes to be allowed to send to and/or receive from a host. Each proposal can include a list of messages that is sufficient to allow the accessory to execute at least some subset of its functionality, and different proposals 134 can be ranked in order of accessory preference; for instance, a proposal that provides full accessory functionality set may be ranked ahead of a proposal that provides partial functionality. In some embodiments, one or more proposals 134 can be generated for the accessory in advance (e.g., incorporated into the accessory firmware); in addition or instead, proposals 134 can be generated in real time (e.g., based in part on information provided by the host device).

As shown in inset 120, host device 100 can include host-side identification logic 122 and proposal rules 124. Proposal rules 124 can include rules for determining whether a particular combination of messages proposed by an accessory can be concurrently supported, what capabilities an accessory is required to have in order to support a particular message, and so on. Specific examples of rules for evaluating proposals are described below.

In operation, when host device 100 and accessory device 102 establish a connection, accessory-side identification logic 132 can select (or generate) one proposal 134 to present to host device 100 in an identification message 140. Host-side identification logic 122 can receive identification message 140 and determine whether to accept or reject the proposal. This determination can be made by referring to proposal rules 124. Host-side identification logic 122 can communicate its determination to accessory-side identification logic 134 as a response 142. If the proposal is accepted, the accessory and host device can communicate and, in the course of communication, can exchange any messages listed in the accepted proposal 134. If the proposal is rejected, accessory-side identification logic 132 can select (or generate) another proposal 134 and present the new proposal 134 in a new identification message 140. This process can continue until host 100 accepts a proposal, until accessory 102 determines not to send a further proposal, or host 100 signals that further attempts will not be permitted.

It will be appreciated that the host device and accessory of FIG. 1 are illustrative and that variations and modifications are possible. A host device and/or an accessory can implement any combination of functionality. In some embodiments, rather than the accessory presenting proposals for acceptance (or rejection) by the host, the host can present proposals to the accessory, and the accessory can issue a decision accepting or rejecting a proposal from the host. In embodiments described herein, a proposal is accepted or rejected as a whole. Other embodiments may define an iterative negotiation process in which one device can receive a proposal from the other device, modify a portion of the proposal that is not accepted, and send a modified proposal to the other device for consideration; upon receipt of a modified proposal, the other device can either accept the modified proposal or make further modifications, and the process can continue until a proposal sent by either device is accepted by the other.

Identification messages and decisions can be communicated using various message formats and signaling techniques, with details depending on the accessory protocol. The decision process can implement a number of rules incorporating any available information about the accessory and/or the host. Examples of suitable formats and processes are described below.

Figure 2:
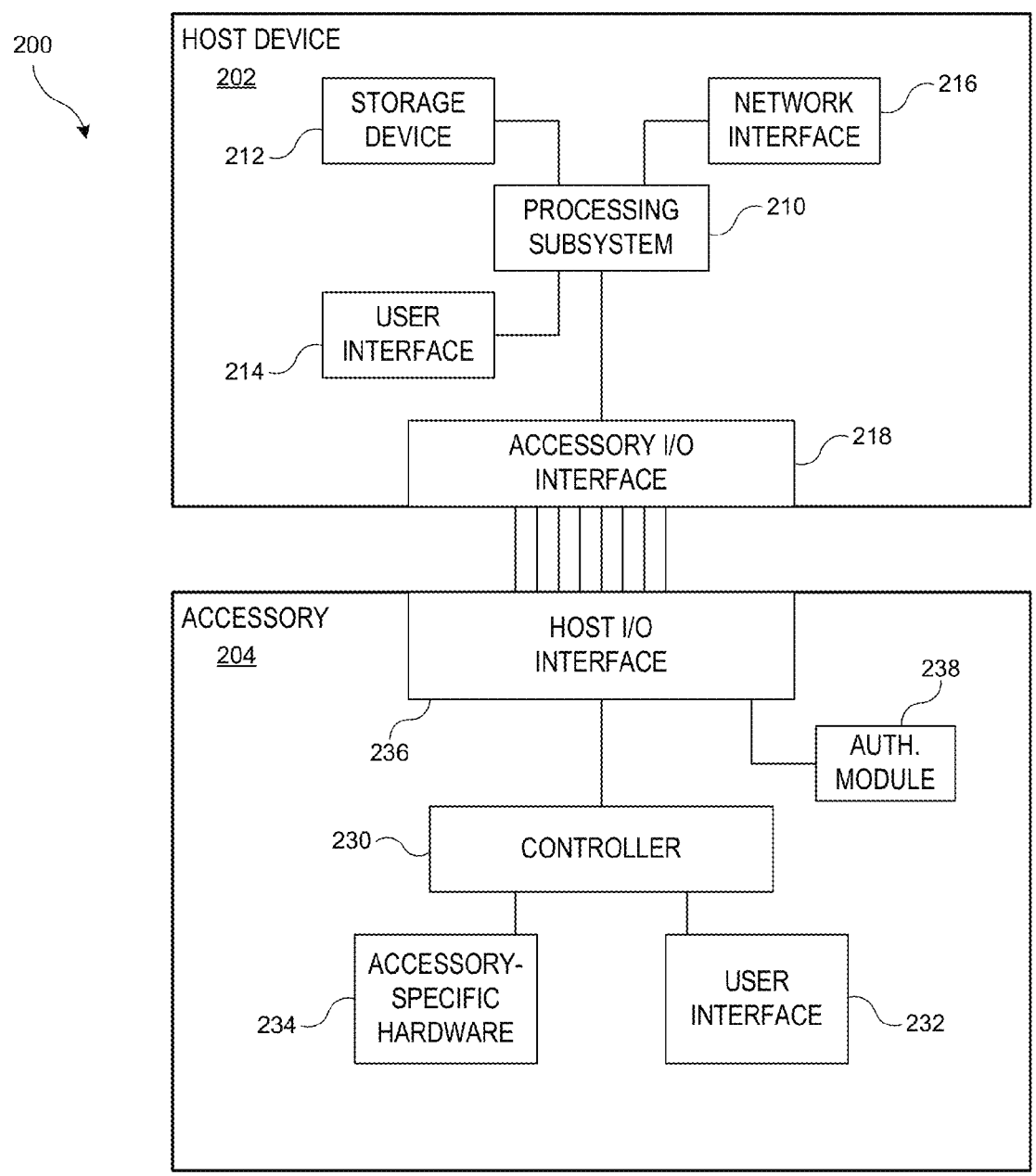
FIG. 2 is a simplified block diagram of a system including a host device and an accessory according to an embodiment of the present invention.

A host device and an accessory can be implemented as separate computing devices that communicate via one or more interfaces to support interoperation. FIG. 2 is a simplified block diagram of a system 200 including a host device 202 and accessory 204 according to an embodiment of the present invention. In this embodiment, host device 202 (e.g., implementing host device 100 of FIG. 1) can provide computing, communication, media playback, and/or other capabilities. Host device 202 can include processing subsystem 210, storage device 212, user interface 214, network interface 216, and accessory input/output (I/O) interface 218. Host device 202 can also include other components (not explicitly shown) such as a battery, power controllers, and other components operable to provide various enhanced capabilities.

Storage device 212 can be implemented, e.g., using disk, flash memory, or any other non-transitory storage medium, or a combination of media, and can include volatile and/or non-volatile media. In some embodiments, storage device 212 can store media objects such as audio files, video files, image or artwork files; information about a user's contacts (names, addresses, phone numbers, etc.); information about a user's scheduled appointments and events; notes; and/or other types of information. In some embodiments, storage device 212 can also store one or more application programs to be executed by processing subsystem 210 (e.g., video game programs, personal information management programs, media playback programs, etc.).

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of host device 202 and can view and/or hear output from host device 202 via output devices of user interface 214.

Processing subsystem 210 can be implemented as one or more integrated circuits, e.g., one or more single-core or multi-core microprocessors or microcontrollers, examples of which are known in the art. In operation, processing system 210 can control the operation of host device 202. In various embodiments, processing subsystem 210 can execute a variety of programs in response to program code and can maintain multiple concurrently executing programs or processes. At any given time, some or all of the program code to be executed can be resident in processing subsystem 210 and/or in storage media such as storage device 212.

Through suitable programming, processing subsystem 210 can provide various functionality for host device 202. For example, in some embodiments, processing subsystem 210 can implement some or all of host-side identification logic 122 of FIG. 1. Processing subsystem 210 can also execute other programs to control other functions of host device 202, including application programs that may be stored in storage device 212; in some embodiments, these application programs may interact with accessory 204, e.g., by generating messages to be sent to accessory 204 and/or receiving messages from accessory 204.

Network interface 216 can provide voice and/or data communication capability for host device 202. In some embodiments network interface 216 can include radio frequency (RF) transceiver components for accessing wireless voice and/or data networks (e.g., using cellular telephone technology, advanced data network technology such as 3G or EDGE, Wi-Fi (IEEE 802.11 family standards), or other mobile communication technologies, or any combination thereof), components for short-range wireless networking (e.g., using Bluetooth standards), GPS receiver components, and/or other components. In some embodiments network interface 216 can provide wired network connectivity (e.g., Ethernet) in addition to or instead of a wireless interface. Network interface 216 can be implemented using a combination of hardware (e.g., driver circuits, antennas, modulators/demodulators, encoders/decoders, and other analog and/or digital signal processing circuits) and software components.

Accessory I/O interface 218 can allow host device 202 to communicate with various accessories such as accessory 204. For example, accessory I/O interface 218 can support connections to a computer, an external keyboard, a speaker dock or media playback station, a digital camera, a radio tuner, an in-vehicle entertainment system or head unit, an external video device, a memory card reader, and so on. In some embodiments, accessory I/O interface 218 can include a connector, such as connectors corresponding to the connectors used in various iPod®, iPhone®, and iPad® products, as well as supporting circuitry. The connector can provide connections for power and ground as well as for one or more data communication interfaces such as Universal Serial Bus (USB), FireWire (IEEE 1394 standard), and/or universal asynchronous receiver/transmitter (UART). In some embodiments, the connector provides dedicated power and ground contacts, as well as some number (e.g., four) of programmable digital data contacts that can be used to implement different communication technologies in parallel; for instance, two pins can be assigned as USB data pins (D+ and D−) and two other pins can be assigned as serial transmit/receive pins (e.g., implementing a UART interface); the assignment of pins to particular communication technologies can be negotiated while the connection is being established. In some embodiments, the connector can also provide connections for audio and/or video signals, which may be transmitted to or from host device 202 in analog and/or digital formats. Thus, accessory I/O interface 218 can support multiple communication channels, and a given accessory can use any or all of these channels. In some embodiments, accessory I/O interface 218 can support wireless communication (e.g., via Wi-Fi, Bluetooth, or other wireless protocols) in addition to or instead of wired communication channels.

Accessory 204 (e.g., implementing accessory 102 of FIG. 1) can include controller 230, user interface device 232, accessory-specific hardware 234, host I/O interface 236, and authentication module 238. Accessory 204 is representative of a broad class of accessories that can interoperate with a host device, and such accessories can vary widely in capability, complexity, and form factor. Various accessories may include components not explicitly shown in FIG. 2, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on. In addition, some accessories may provide an additional interface (not shown) that can connect to and communicate with another accessory.

Controller 230 can include, e.g., one or more single-core or multi-core microprocessors and/or microcontrollers executing program code to perform various functions associated with accessory 204. For example, where accessory 230 incorporates a user-operable control (e.g., controls 116 of FIG. 1), controller 230 can interpret user operation of the control and responsively invoke functionality of accessory 204; in some instances, the invoked functionality can include sending messages to and/or receiving messages from host device 202. As another example, controller 220 can implement some or all of accessory-side identification logic 132 of FIG. 1.

User interface 232 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 204, a user can operate input devices of user interface 232 to invoke functionality of accessory 204.

Accessory-specific hardware 234 can include any other components that may be present in accessory 204 to enable its functionality. For example, in various embodiments accessory-specific hardware 234 can include one or more storage devices using fixed or removable storage media; GPS receiver; a network interface; power supply and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 234.

Host I/O interface 236 can allow accessory 204 to communicate with host device 202. In accordance with some embodiments of the invention, host I/O interface 236 can include a connector that mates directly with a connector included in host device 202, such as a connector complementary to the connectors used in various iPod®, iPhone®, and iPad® products. Such a connector can be used to supply power to host device 202 and/or receive power from host device 202, to send and/or receive audio and/or video signals in analog and/or digital formats, and to communicate information using one or more data communication interfaces such as USB, UART, and/or FireWire. Other connectors may also be used; for example, host I/O interface 236 can incorporate a standard USB connector and can connect to accessory I/O interface 218 of host device 202 via an adapter cable. In other embodiments, host I/O interface 236 can support wireless communication (e.g., via Wi-Fi, Bluetooth, or other wireless protocols) in addition to or instead of wired communication channels.

Authentication module 238 can provide authentication information to host device 202, e.g., to verify the identity of accessory 204. For example, authentication module 238 can store a digital certificate that can be provided to host device 202 when a connection is established between host I/O interface 236 and accessory I/O interface 218. Authentication module 238 can also include cryptographic logic. In some embodiments, to verify the identity of accessory 204, host device 202 can send a random nonce to be digitally signed (e.g., encoded) by accessory 204 using a private key, and authentication module 238 can store the private key as well as programmed or hardwired control logic to use the stored private key to sign the random nonce. A variety of authentication mechanisms can be implemented.

Accessory 204 can be any electronic apparatus that interacts with host device 202. In some embodiments, accessory 204 can provide remote control over operations of host device 202, or a remote user interface that can include both input and output controls (e.g., a display screen to display current status information obtained from host device 202). Accessory 204 in various embodiments can control any function of host device 202 and can also receive data objects from host device 202. In other embodiments, host device 202 can control operations of accessory 204, such as retrieving stored data from a storage medium of accessory 204, initiating an image capture operation by a camera incorporated into accessory 204, etc.

It will be appreciated that the system configurations and components described herein are illustrative and that variations and modifications are possible. The host device and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a host device can have some functionality that is not accessible or invocable via an accessory device; likewise, an accessory device can have some functionality that is not accessible or invocable via a host.

Connectors at the respective I/O interfaces 218, 236 of host device 202 and accessory 204 can be complementary or not as desired. Where two connectors are not complementary, an adapter (not shown) can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the host device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatus including electronic devices implemented using any combination of circuitry and software.

Accessory I/O interface 218 of host device 202 and host I/O interface 236 of accessory 204 allow host device 202 to be connected with accessory 204 and subsequently disconnected from accessory 204. As used herein, a host device and an accessory are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, a host device and an accessory can communicate while connected by exchanging messages and data according to an "accessory protocol." The messages and data can be communicated, e.g., using any wired or wireless transport medium provided by the relevant interfaces.

The accessory protocol can define a "universe" of messages that can be exchanged between host device 202 and any accessories connected thereto, such as accessory 204. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error-detection or error-correction codes as known in the art.

In some embodiments, the messages can be logically grouped into a "general" message set and an "optional" message set. Every accessory and every host device that use the accessory protocol can be required to support at least the general message set. This message set can include messages enabling the host device and the accessory to identify and authenticate themselves to each other and to negotiate the functionality that they will mutually support. For example, the general message set can include a message the accessory can send to the host device to list every message in the optional set that the accessory is capable of sending and every message in the optional set that the accessory is capable of receiving and acting on; examples are described below. The general message set can also include authentication messages that the host device can use to verify the purported identity and capabilities of the accessory (or vice versa), and the accessory (or host device) may be blocked from invoking certain (or all) of the optional messages if the authentication is unsuccessful.

The optional message set can include messages related to various functionality that might or might not be supported by a given accessory. For example, the optional message set can include simple remote messages that allow an accessory to identify a function of the host device to be invoked, remote user interface messages that can be used to obtain information related to replicating all or part of a user interface of a host device on an accessory (thereby supporting a more advanced remote control), messages that allow a user to control a radio tuner in an accessory by operating a host device and/or to control a radio tuner in a host device by operating an accessory, messages that facilitate transfers of data objects between the host device and the accessory, and so on. Any combination of optional messages can be defined in an accessory protocol, and there is no requirement that a given accessory or host device support all (or even any) of the optional messages.

Figures 3, 4:
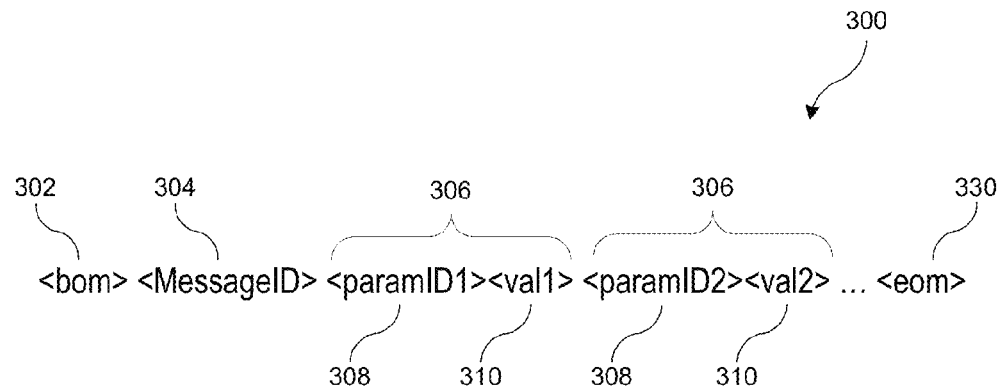
FIG. 3 illustrates a format for a message that can be implemented according to an embodiment of the present invention.
FIG. 4 is a table showing identification messages according to an embodiment of the present invention.

FIG. 3 illustrates a format for a message 300 that can be implemented according to an embodiment of the present invention for some or all of the messages defined in the accessory protocol. Each message 300 can begin with a beginning-of-message ("BOM") flag 302. BOM flag 302 can be, e.g., a particular byte code, character, or character sequence used to indicate that what follows is a message A message identifier (MessageID) 304 can follow BOM flag 302; this identifier indicates which message is being sent. In some embodiments, all messages have the same length ($L_M$) and can be, e.g., 1 byte or 2 bytes, depending on the total number of messages the protocol is to support.

Following the message ID 304 can be zero or more parameter/value pairs 306 associated with the message ID. Different message IDs may have different numbers of associated parameters (including zero parameters for some message IDs), and depending on implementation, some or all of the parameters associated with a particular message ID may be optional. To allow for flexibility, each parameter/value pair can include an explicit parameter identifier (paramID) 308, followed immediately by its value 310 for that parameter. The parameter IDs can be fixed length (e.g., 1 byte) for all parameters, with a different ID assigned to each parameter associated with a particular message ID. The length of value 310 can depend on the parameter ID. Examples of parameter IDs and values associated with identification and negotiating interoperating capabilities are described below. After the last parameter/value pair 306, message 300 can end, e.g., with an end-of-message ("EOM") flag 330. Like BOM flag 302, EOM flag 330 can be, e.g., a particular byte, byte code, character or character sequence. EOM flag 330 can be a distinct value from BOM flag 302 and distinct from any byte code associated with a parameter ID.

In some embodiments, every message conforming to the accessory protocol uses the format of message 300, including messages sent by both devices. The recipient of message 300 can parse the message by recognizing BOM flag 302, interpreting the next $L_M$ bytes as message ID 304, then interpreting each included parameter/value pair 306 based on the message ID. Thus, for example, a paramID of 6 in association with a message ID for a "set video resolution" message can signify that the associated value indicates a screen size in pixels, while a parameter ID of 6 in association with a "set audio sampling rate" message signifies that the associated value indicates a number of samples per second.

As noted above, the length of the parameter value can depend on the parameter ID. A recipient parsing a received message can read parameter ID 308, determine the expected length ($L_V$) of the associated value (e.g., in bytes), and accordingly interpret the next $L_V$ bytes as the value. The following byte can be interpreted as the next parameter value, unless it corresponds to the byte code assigned to EOM flag 330, in which case the message is regarded as complete.

The use of explicit parameter/value pairs (rather than, e.g., assuming a parameter order) provides flexibility. For example, some or all of the parameters associated with a particular message ID 304 can be assigned a default value, and the sender can omit from message 300 any parameters for which the default value is to be used. This can reduce message length. In addition, as the protocol develops over time (e.g., to accommodate new devices and/or new functionalities), new parameters can be added to a message. Forward and backward compatibility can be maintained as long as default values are defined for any new parameters that are added to a message after its initial definition is established. Even if a device does not send a particular parameter (e.g., because it implements an older version of the protocol that predates the definition of the new parameter), the recipient can still parse the message and act appropriately. In some embodiments, the protocol can specify that if a device receives a message with a recognized message ID but an unrecognized parameter ID, the device should ignore the unrecognized parameter. This can allow a device implementing an older version of the protocol to interoperate with a newer device, without either device having to negotiate version-specific differences.

As described above, messages 300 can include messages related to identification of an accessory to a host device (and/or vice versa) and to negotiating the functionality the devices will cooperatively implement (also referred to herein as an operating agreement). FIG. 4 is a table 400 showing identification messages according to an embodiment of the present invention. For each message in column 402, a valid direction (host to accessory or accessory to host) is indicated in column 404; column 406 describes parameters that can be included with each message.

An IDStart message can be sent by a host to an accessory to initiate an identification process. The IDStart message in this example includes no parameters; it merely indicates that the host is ready to receive an identification proposal from the accessory. In some embodiments, the IDStart message can include parameters providing basic information about the host device (e.g., manufacturer and model identifiers, firmware version, or the like). In some embodiments, separate messages (not shown) can be sent by the host to provide host-identifying information to the accessory.

An IDInfo message can be sent by the accessory to the host to provide an identification proposal. The IDInfo message can include as parameters a number of "info items," each of which can have an associated value. Specific examples are described below with reference to FIG. 5. In some embodiments, a single IDInfo message can include all of the identifying information about the accessory, including manufacturer and model information; a list of accessory-protocol messages the accessory proposes to be allowed to send and/or receive; information identifying applications with which the accessory can interact; information about settings and preferences of the accessory; information about power supply and/or power consumption characteristics of the accessory; and information about physical transports supported by the accessory (e.g., USB, UART or other serial ports, Bluetooth, Wi-Fi, other wireless transports). Depending on implementation, the IDInfo command can provide the host with complete information about the accessory's capabilities and proposed functionality to any degree of detail desired. Accordingly, in some embodiments, an accessory can present a proposal for interoperation to the host by sending an IDInfo message.

An IDAccept message can be sent by the host to the accessory to indicate that a proposal (e.g., as communicated by an IDInfo message) is accepted; an IDReject message can be sent by the host to the accessory to indicate that a proposal has been rejected. In some embodiments, the host determines whether to accept or reject a proposal based on information in the IDInfo command and its own set of rules. Examples are described below.

An IDTimeout message can be sent by the host to the accessory to indicate a timeout condition. For example, if the host sends an IDStart message and the accessory does not respond with an IDInfo message within a set period of time, the host can send an IDTimeout message to indicate that future messages, including IDInfo messages, will not be accepted. In a situation where the accessory sends an IDInfo message but for some reason the host does not receive it, the IDTimeout message can alert the accessory to the problem; this message can prevent the accessory for waiting indefinitely for a response from the host.

An IDCancel message can be sent by the accessory to indicate that it does not intend to complete the identification process (which can include negotiation of an operating agreement). This message can be sent, e.g., after the accessory receives an IDReject message, if the accessory determines that it will not retry. In response to an IDCancel message, the host device can terminate the connection to the accessory or restart the identification, e.g., by sending a new IDStart message. In some embodiments, an accessory that has completed the identification process can send an IDCancel message at any time in order to re-identify itself, and the host can respond by sending a new IDStart message.

An IDUpdate message can be sent by the accessory to update an identification after it has been accepted. In some embodiments, the parameters that can be updated using an IDUpdate message can be restricted to a subset of parameters of the IDInfo message. Thus, for example, an accessory may be permitted to change its name or certain user-preference settings by sending an IDUpdate message but not permitted to change the list of messages it can send or receive.

As noted above, an IDInfo message can include all of the identifying information about the accessory. FIG. 5 is a table 500 listing parameters that can be defined for an IDInfo message according to an embodiment of the present invention. Each parameter listed in column 502 has a parameter type (column 504) that determines its length and a valid number range (column 506) indicating the number of instances of the parameter that can be included in one IDInfo message. Update column 508 indicates, for each parameter, whether that parameter can also be included in an IDUpdate message. Any parameters that cannot be included in an IDUpdate message can be changed by the accessory, e.g., by sending an IDCancel message and a new IDInfo message.

A first group of parameters 510 includes parameters providing basic information about the accessory, e.g., its name, manufacturer, model, serial number, firmware version and hardware version. Each of these parameters can be defined as a "string" type with a fixed length (e.g., 32 characters). As indicated in column 506, in some embodiments, the accessory is required to supply exactly one value for each of these parameters. Accordingly, a host can reject an IDInfo message that fails to specify these parameters.

A second group of parameters 512 includes parameters identifying specific messages from the accessory protocol that the accessory proposes to be allowed to send and receive; such messages are referred to as being included in a proposed "operative" subset. In this example, separate parameters are used to specify messages the accessory can send (Message-Send List) and messages the accessory can receive (Message-Receive List). Each parameter can be defined as an "array" type, and each element of the array can be exactly the size $L_M$ of a message code (e.g., 1 or 2 bytes); thus, the value for each parameter can be a list of the appropriate message codes. It is contemplated that the length of the list can vary, depending on the details of accessory functionality and protocol implementation (e.g., what communications use distinct messages versus using the same message with different parameter values).

To allow for lists of variable length, in some embodiments, the length of an array-type parameter value can be variable. For example, the array can begin with a size indicator, e.g., one or two bytes to indicate the number of elements in the array, followed by the elements of the array (in this case, the actual message codes for the messages to be sent or received). The size indicator can also indicate the size of each element (which can be the same for all elements), or the element size can be determined based on the parameter ID with which the array is associated. Based on the parameter ID, the recipient can recognize that what follows is an array, read the size indicator, then read each element of the array.

In the embodiment shown the accessory specifies exactly one list of messages to be sent and exactly one list of messages to be received. As described above, in some embodiments the universe of messages can be divided into a set of general messages and a set of optional messages, and the protocol can specify that the general messages are always included in the operative subset regardless of whether they are included in the accessory's lists. Thus, for example, identification-related messages (e.g., the messages listed in FIG. 4) can be included in the general message set, and the host can infer that the accessory supports these messages from the fact that the accessory responds to an IDStart message by sending an IDInfo message. In some embodiments, if the accessory does not intend to send any messages other than general messages, the accessory can send a message-list parameter with an empty array (e.g., an array containing one entry having a null value).

A third group of parameters 514 includes parameters related to the accessory's interoperation with particular applications that might or might not be installed on a particular host device. For example, the IDInfo message can include a Preferred App parameter to specify an identifier of an application with which the accessory is designed to interoperate. The identifier can be a string, such as a name or a unique code assigned to the application (e.g., at an application store through which the application is distributed), and the host device can use the identifier to determine whether the application is installed. Some accessories may choose not to specify a particular application; accordingly, an IDInfo message can include either zero or one instances of a Preferred App parameter.

In addition or instead, the IDInfo message can include an App-Protocols parameter to provide information about the accessory's ability to support a particular application-specific protocol. (An application-specific protocol allows messages to be passed between the accessory and the application using the accessory protocol as a conduit, with the accessory protocol being agnostic as to the content of such messages.)

In this example, application-specific protocol information can be provided using a structured "field" type for the parameter value. In some embodiments, a field-type parameter value can be implemented as a group of fixed-length fields, with the field definitions and lengths of each field being fixed for a particular parameter. Alternatively, a field-type parameter value can be implemented much like the parameter list shown in FIG. 3, using key/value pairs, but within a single parameter rather than as separate parameters. In some embodiments, all key/value pairs defined for a field-type parameter are required to be included, to facilitate parsing. Whether a field-type parameter can be "nested" within a field-type parameter is a matter of design choice.

The field for an App-Protocol parameter can include, e.g., a fixed-length string containing a name of a supported application-specific protocol, a fixed-length integer providing an identification number for the application-specific protocol, and/or a byte code identifying an action to be taken depending on whether the host device has an installed application capable of using the identified protocol (e.g., if the application is not found, the host can be instructed to search for a suitable application in an application store, query the user as to whether a search should be made, or do nothing). In some instances, an accessory might not support application-specific protocols, and in some instances, an accessory might support more than one application-specific protocols; accordingly, an IDInfo message can include any number (zero or more) of instances of an App-Protocols parameter.

A fourth group of parameters 516 includes parameters related to the accessory's support for language-based and/or regional differences in operation. For example, a keyboard accessory may be able to support different character sets depending on language and/or region; an accessory that displays information may also be able to present the information in different languages or in the same language with regional variations (e.g., U.K. vs. U.S. spellings in the case of English). An accessory that is capable of supporting different languages and/or regions can use the Current Language and/or Current Region parameters to identify the currently-selected language and/or region, e.g., as a string containing a recognized name for the language or region. Since only one language and one region can be current at a given time, no more than one instance of either parameter can be included in an IDInfo message.

If the accessory supports multiple languages and/or multiple regions, the accessory can supply a list of supported languages and/or regions using the Supported Language and Supported Region parameters. Any number of instances of each parameter can be included, with the parameter value being a string containing a recognized name of a language or region. In some embodiments, the current language and region are presumed to be supported and do not need to be provided using both "current" and "supported" parameters.

A fifth group of parameters 518 includes parameters related to accessory power and power management. For example, the Charger Type parameter can indicate one of a set of enumerated power types, depending on whether and how the accessory provides power to the host. Types can include, for example, "passthrough" to indicate that the accessory draws power from an external source and passes at least some of that power to the host, "self-powered" to indicate that the accessory draws power from an internal source (e.g., its own battery, solar panel or the like) and can provide at least some of that power to the host; and "none" to indicate that the accessory does not provide power to the host. In some embodiments, the IDInfo command is required to include the Charger Type parameter with one of the enumerated options as a value.

The Max Current Supply parameter can be included in some embodiments to specify the maximum amount of current that the accessory can supply to the host. The current can be specified, e.g., as a fixed-length integer (e.g., 8-bit) representing the maximum current in milliamps (mA). In some embodiments, if the IDInfo command indicates that the Charger Type is "none," the Max Current Supply parameter can be omitted. In addition, some embodiments may specify a default value that the host will assume for the Max Current Supply parameter for each Charger Type, and the IDInfo command can omit the Max Current Supply parameter if the default value is acceptable to the accessory.

The Max Current Draw parameter can be included in some embodiments to specify the maximum amount of current that the accessory will draw from the host. Again, the current can be specified, e.g., as a fixed-length integer (e.g., 8-bit) representing the maximum current (in mA). Some embodiments may specify a default value that the host will assume for the Max Current Draw parameter, and the IDInfo command can omit the Max Current Draw parameter if the default value is acceptable to the accessory. It is not required that the accessory actually draw the specified maximum current (or indeed any current) from the host at any time.

A sixth group of parameters 520 includes parameters related to each communication interface supported by the accessory. It is contemplated that every accessory should support at least one communication interface, but an accessory can have multiple interfaces, and depending on implementation, some accessories can use multiple interfaces to communicate with the same host device. Parameters 520 allow the accessory to provide information related to operation of each available interface. In any given instance, an IDInfo command can include at least one instance of at least one of the parameters of this group and can include multiple parameters and/or multiple instances of one parameter depending on what interfaces are available.

For each type of interface, the field can include appropriate information. For example, for any type of interface, the field can include an identifier to be associated with that interface, a name for that interface, and a bit to indicate whether that interface supports accessory-protocol communication. The field for a particular type of interface can also indicate other information specific to interfaces of that type. For instance, a USB Host Settings field can include information about audio sample rate(s) supported by the USB host interface. A Bluetooth Settings field can indicate a supported version or flavor of Bluetooth (e.g., Classic, Low Energy, Nordic), a MAC address for the Bluetooth interface, a pairing method to be used (e.g., PIN code or secure sample pairing), and a PIN code (if needed). More generally, the field for a particular interface can include any information that the host would use to establish a connection on that interface.

It will be appreciated that the message formats, messages, and parameters described herein are illustrative and that variations and modifications are possible. Other parameters can also be defined for the IDInfo command, in addition to or instead of the examples shown above. For example, if the accessory has input controls, the accessory can provide information about the number, type and arrangement of the input controls. The accessory can also provide information regarding other capabilities and/or components, such as navigation (e.g., using GPS or the like), video output, audio output, or the like. In some embodiments, the IDInfo command can indicate by inference that the accessory has certain capabilities. For example, one or both of the message-list parameters may include messages pertaining to delivering GPS coordinates to and/or receiving GPS coordinates from the host device; from this, the host can infer that the accessory is capable of producing and/or consuming GPS information. As another example, the Messages-Send list can include a message requesting a video stream from the host device; from this, the host can infer that the accessory is capable of receiving a video stream.

In some embodiments, an accessory can itself be a multifunctional device, such as an in-vehicle head unit, that can incorporate a number of components, such as a Bluetooth-based speakerphone component, a touchscreen display, and other control devices (e.g., control buttons on the steering wheel). The IDInfo message can define parameters that allow an accessory to identify each of its components and the capabilities thereof, all as part of the same accessory.

Information identifying messages to be sent and messages to be received can be presented in a single list or divided into multiple lists. In some embodiments, each message code is valid in only one direction, and no ambiguity results from presenting a single list. In some embodiments, some message codes can be valid in both directions, and the accessory can indicate whether it intends to send and/or receive a particular message, e.g., by appending a directional indicator to the message code or by providing separate lists of messages to be sent and received (e.g., as shown in FIG. 5).

It is to be understood that the lists of messages that can be sent and/or received can be overinclusive. That is, the accessory need not actually send every message included in the Message-Send list or receive every message included in the Message-Received list. In some embodiments, the message lists (if accepted by the host) bind the accessory to the following operating agreement: (1) The accessory agrees not to send to the host any message that is not on the Message-Send list (with the exception of any messages that the protocol presumes to be sendable, such as the identification messages in FIG. 4), and the host can ignore any such messages the accessory sends. (2) The accessory does not expect to receive any message that is not on the Message-Received list. (3) Receipt by the accessory of any message that is on the Message-Received list will not cause the accessory to send an error message to the host.

Figure 6:
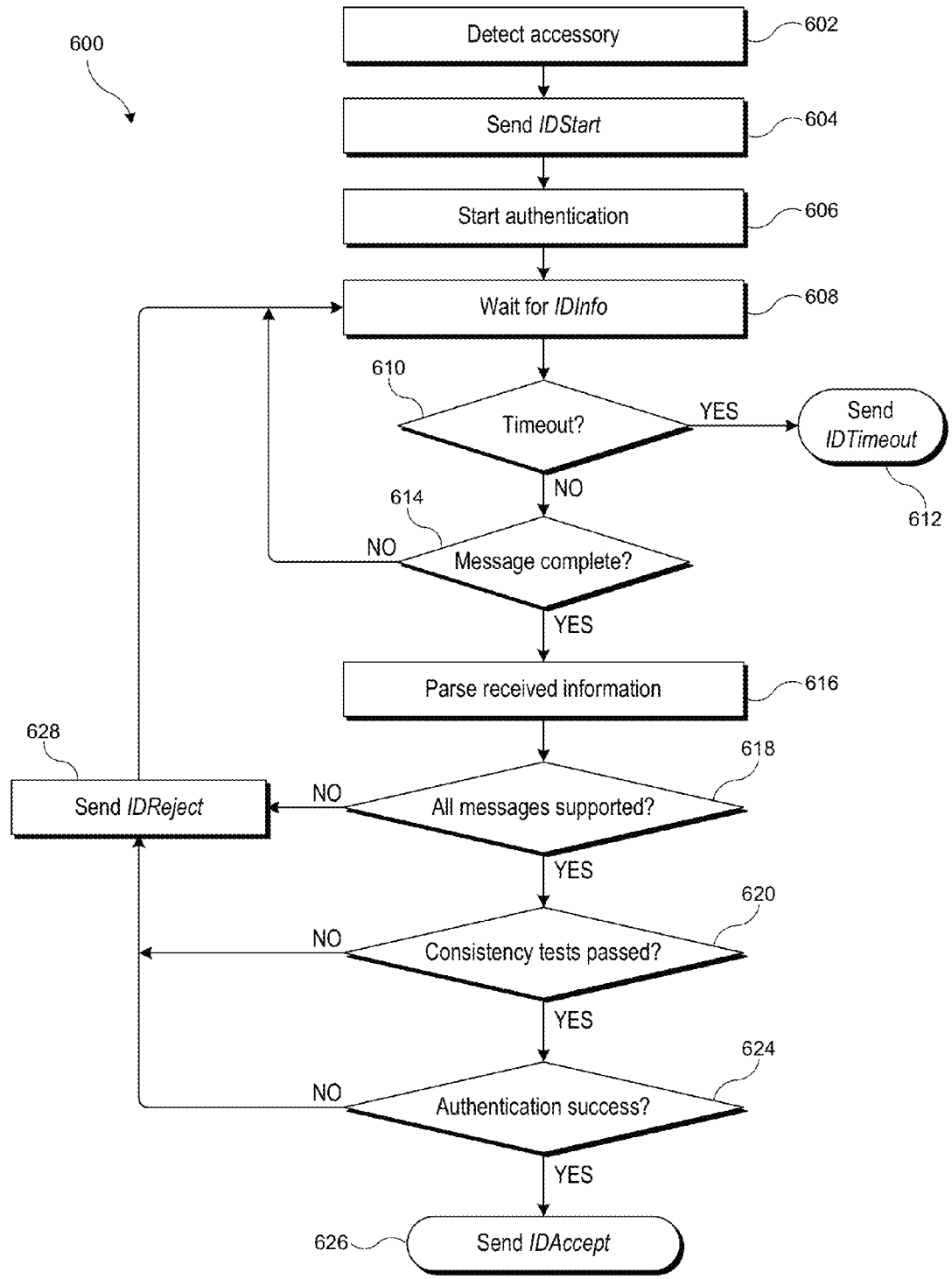
FIG. 6 is a flow diagram of a process for negotiating identification that can be implemented in a host device according to an embodiment of the present invention.

Identification messages as described above can be used to support identification of an accessory device to a host device, including negotiation of an operating agreement. FIG. 6 is a flow diagram of a process 600 for negotiating identification that can be implemented in a host device (e.g., host device 100 of FIG. 1 or host device 202 of FIG. 2) according to an embodiment of the present invention.

Process 600 can begin at block 602, when the host detects a connection to an accessory. For example, the accessory may be connected to a connector on the host device as shown in FIG. 1, and the connected accessory may pull one or more pins on the connector to particular voltages indicating the presence of the accessory. An accessory may also request a connection via a wireless protocol (e.g., Bluetooth or Wi-Fi), and the host can respond to establish a connection usable to exchange accessory-protocol messages.

At block 604, the host can request that the accessory identify itself, e.g., by sending an IDStart message as described above. The host can also start an authentication process at block 606 to verify authenticity of the accessory. In some embodiments, the authentication process can include requesting and receiving a digital certificate from the accessory, confirming the validity of the digital certificate (e.g., by comparing it to lists of known good and/or known bad certificates), and issuing a random nonce or challenge to the accessory for the accessory to digitally sign using a private key and return; the signed nonce can be verified by the host device using a public key associated with the digital certificate. The authentication requests and responses can be implemented, e.g., using messages in the general message set of the accessory protocol. (As with the identification messages, it can be assumed that all accessories and all hosts are capable of sending and receiving authentication messages, and failure of an accessory to respond properly or at all to an authentication message can be interpreted by the host as failure of the authentication process.) In some embodiments, the authentication process can run in the background while process 600 continues with identification. In other embodiments, process 600 can wait at block 606 for authentication to complete and proceed further only if authentication is successful.

At block 608, process 600 can wait for an IDInfo message from the accessory. In some embodiments, the host does not wait indefinitely. For example, at block 610, process 600 can determine whether a timeout period has elapsed since the IDStart message was sent. The period can be, e.g., 100 milliseconds, 2 seconds, or any other desired time period. If the timeout period has elapsed, then at block 612, process 600 can exit, sending an IDTimeout message as described above to the accessory. To re-attempt identification after a timeout, the accessory can reestablish the connection, thereby restarting process 600 at block 602. Depending on implementation, reestablishing the connection might or might not require physical disconnection and reconnection of the devices or other user intervention (e.g., pressing a reset button on the accessory). In some embodiments, the host does not have a timeout period, and process 600 can wait for an IDInfo message for as long as the accessory remains connected.

If, at block 610, the timeout period has not elapsed, then at block 614, process 600 can determine whether a complete IDInfo message has been received. In some embodiments, a single IDInfo message can be split across multiple packets for transport to the host, and it is possible that at some moment, only part of the IDInfo message has been received. If the message is not complete, process 600 can continue to wait (block 608) until either the complete message is received or a timeout occurs. In some embodiments, receipt of a partial IDInfo message can reset the timeout interval, allowing the accessory more time to complete the message. In some embodiments, an accessory can send multiple IDInfo messages, each containing a portion of the identifying information, and block 614 can include detecting a different message (e.g., an "ID Complete" message) indicating that the accessory has finished sending IDInfo messages.

Once the complete IDInfo message has been received, at block 616, the host device can parse the received information and determine whether to accept or reject it, e.g., by applying various decision rules. For example, at block 618, the host device can read the list(s) of proposed operative messages (e.g., the Message-Send List and Message-Receive List parameters of FIG. 5) and determine whether the host is capable of receiving all the sendable messages and sending all the receivable messages. If the host is not so capable, then the identification can be rejected.

Similarly, at block 620, the host can perform other compatibility tests based at least in part on the information provided by the accessory. For example, the manufacturer and model information can be used to determine certain capabilities of the accessory, such as whether it can provide GPS coordinates or receive video. If the accessory includes a "send GPS coordinates" message in its Message-Send list but is not known to be capable of providing GPS coordinates, a compatibility test can be failed. Similarly if the accessory includes a "Video Request" message in its Message-Receive list but is not known to be capable of receiving video signals, another compatibility test can be failed. In some embodiments, the test can based on whether the accessory is known to be incapable of doing something its message list implies it can do, rather than on known capabilities.

In some embodiments, rather than relying on explicit information about a particular accessory's capabilities (or lack thereof), the host device can infer from the messages list that the accessory has certain capabilities. For example, if the accessory indicates that it can send a "Video Request" message, the host can infer that the accessory is capable of receiving video signals. In some embodiments, the optional message set can include a group of messages that are needed to negotiate a video signal format to be delivered to the accessory and to control (e.g., start and stop) a video feed, and the host can require that the accessory supports either the entire group or none of these messages.

In some embodiments, a particular host device may be known to be incompatible with a particular accessory model, and this known incompatibility can also be the basis for failure of a compatibility test.

A compatibility test can also be defined to enforce user expectations regarding device behavior. For example, if a user can interact with a particular accessory to define a playlist of media assets stored on the host device (e.g., by invoking smart playlist functionality or operating a remote interface provided by the accessory to select assets from the host's media asset database), the user may reasonably expect to be able to interact with the same accessory to play such a playlist. Accordingly, a test can be defined that is failed if the accessory's list of proposed operative messages includes messages related to defining a playlist on the accessory but does not include messages related to playing such a playlist.

At block 624, the host can determine whether the authentication process begun at block 606 succeeded. For example, success can require that the accessory present a known good certificate (or a certificate not on a known-bad list) and successfully sign the random nonce. Success can also require that the particular certificate be valid for the particular accessory, e.g., based on the accessory model number and/or the messages the accessory has included in the list of proposed operative messages. Other conditions can also be imposed to determine whether authentication is successful.

If all of the tests at blocks 618, 620, and 624 passed, then at block 626, process 600 can accept the identification, e.g., sending an IDAccept message as described above. Process 600 can exit at this point, with identification complete. It is to be understood that the host and the accessory can remain connected and can begin to interoperate according to the negotiated operating agreement, e.g., using any or all of the operative messages in the proposal the host accepted at block 626. This can include messages in the Message-Send and/or Message-Receive lists described above, as well as any messages that are considered operative by default (e.g., general messages as described above).

If any of the tests at blocks 618, 620 or 624 failed, then, at block 628, the host can reject the identification, e.g., by sending an IDReject message. In some embodiments, the IDReject message can include a reason code indicating why the identification was rejected. For example, different reason codes can be assigned to indicate specific failure conditions, such as authentication failure, inability of the host to receive at least one message on the Message-Send list, inability of the host to send at least one message on the Message-Receive list, incompatibility of one or more messages with identified or inferred accessory characteristics, insufficiency of the set of messages to support an associated functionality, etc. In some embodiments, where a particular message led to the rejection, the reason code can also include information identifying the problematic message. Such information can facilitate a retry attempt by the accessory but is not required.

After sending an IDReject message, process 600 can return to block 608, allowing the accessory to retry the identification with a new IDInfo message. In some embodiments, if the identification is rejected because of authentication failure, process 600 can exit rather than permitting the accessory to retry.

In the example shown, process 600 does not limit the number of retries by an accessory. In some embodiments, process 600 can impose a limit, e.g., by incrementing a retry counter each time block 628 is executed and exiting rather than returning to block 608 if the counter reaches an upper limit (e.g., 3 tries). In some embodiments, process 600 can limit retries by implementing a "global timeout" that limits the time that can elapse between the first time process 600 sends an ID Start message and the time a proposed identification is accepted; if no operating agreement has been established at the end of the global timeout period, process 600 can exit. If process 600 exits due to excessive retries (including expiration of a global timeout and/or exceeding a limit on number of retries), the accessory can still continue to attempt to identify, but as at block 612, a disconnect/reconnect sequence can be required.

In some embodiments, an accessory can cancel an identification process at any point during process 600, e.g., by sending an ID Cancel message as described above. If a cancellation message is received at the host while process 600 is being executed, process 600 can exit. At that point, there is no operating agreement in place between the host and the accessory, and the host can lock out (e.g., by ignoring) further communication from the accessory. To resume, the accessory can be required to disconnect and reconnect as described above, thereby restarting process 600 at block 602.

If a cancellation message is received after successful completion of process 600 (e.g., subsequently to block 626), the host can restart process 600 to obtain new identification information from the accessory, e.g., without a disconnect/reconnect sequence. In this circumstance, some embodiments may not require reauthentication (e.g., blocks 606 and 624 can be omitted), as long as the host and accessory remain connected.

Figure 7:
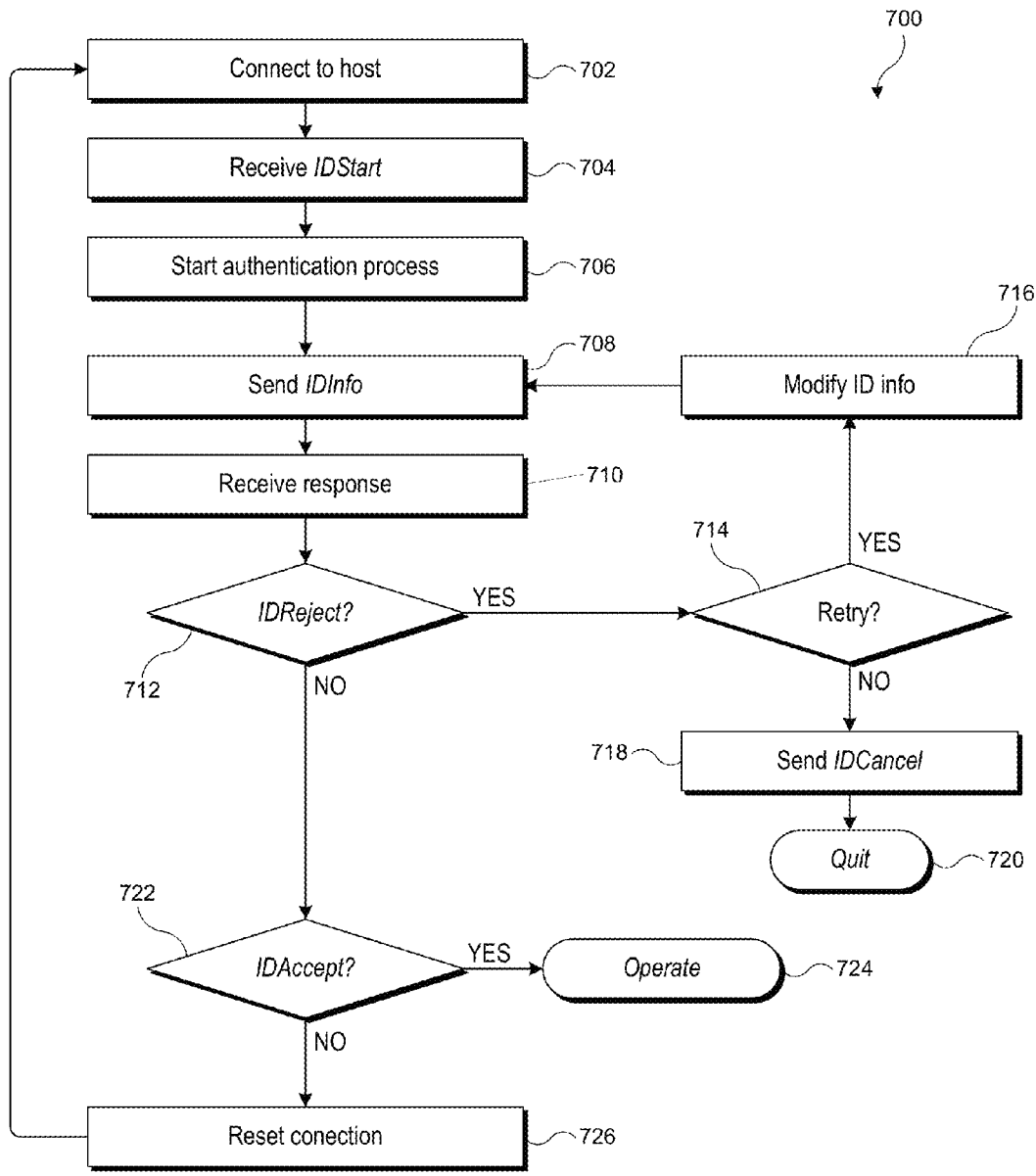
FIG. 7 is a flow diagram of an identification process that can be implemented in an accessory according to an embodiment of the present invention.

FIG. 7 is a flow diagram of an identification process 700 that can be implemented in an accessory (e.g., accessory 102 of FIG. 1 or accessory 204 of FIG. 2) according to an embodiment of the present invention. Process 700 begins at block 702, when the accessory establishes a connection to the host. For example, a connector on the accessory can become engaged with a mating connector on the host (e.g., as shown in FIG. 1), or the accessory can locate a host using a wireless communication protocol and recognize the host as a device capable of communicating via the accessory protocol. Regardless of the details of the communication channel, block 702 can include an operation by which the accessory alerts the host to its presence and readiness to use the accessory protocol to communicate.

At block 704, the accessory can receive an IDStart message from the host, e.g., as described above. At block 706, the accessory can initiate an authentication process with the host; this process can be complementary to the process initiated at block 606 of process 600 described above. As with process 600, authentication at block 706 can be performed in the background concurrently with other operations of process 700, or process 700 can wait at block 706 until authentication is complete and proceed further only in response to successful authentication.

At block 708, the accessory can send an IDInfo message to the host; the IDInfo message can include the accessory's proposal for a list of operative messages. In some embodiments, the accessory can have a prepared IDInfo message that is automatically sent in response to an IDStart message. In some embodiments, the accessory can create or modify the IDInfo message in real time. For example, if the IDStart message (or some other preliminary message or signal received from the host) provides information about the particular host or its capabilities, the accessory can modify its list(s) of operative messages based on that information, e.g., to remove messages known not to be supported by the particular host or to select operative messages that will optimize the accessory's interoperation based on the characteristics of the particular host.

At block 710, the accessory can receive a response from the host to the IDInfo message. In the embodiment shown, valid responses are IDAccept and IDReject. If, at block 712, IDReject is received, then at block 714, the accessory can determine whether to retry the identification. The determination can be based on various decision criteria, such as how many times the accessory has already tried or retried and failed, whether any fallback options (described below) are left, and/or what if any reason code was provided in the IDReject message.

If the decision is to retry, then at block 716, the accessory can modify the IDInfo message. Various strategies can be implemented for modifying the IDInfo message when retrying. For example, the accessory can have one or more prepared "fallback" options for identification arranged in order of decreasing preference. The first option (sent in the initial pass at block 708) may provide an optimum operating experience; successive fallback options may increasingly depart from this optimum, e.g., by removing or reducing functionality or by replacing a more efficient set of operative messages with a less efficient set that can provide similar (if not identical) functionality. At block 716, the accessory can select the next IDInfo message in the sequence of fallback options.

In embodiments where the IDReject message includes a reason code (e.g., as described above), the accessory can use that information in modifying the IDInfo message and/or in determining whether to retry at all. For example, if the reason code identified a particular message on the Message-Send or Message-Receive list as a reason for rejection, the accessory can remove the offending message, assuming acceptable functionality can still be provided (and if not, the accessory can determine not to retry at block 714).

The modified IDInfo message can be sent at block 708, and if another rejection is received, the accessory can determine again whether to retry at block 714. If at any point, the accessory determines not to retry, process 700 can send an IDCancel message at block 718 and exit at block 720. In some embodiments, IDCancel is not sent; as described above, the host-side identification can implement a timeout, and the lack of a response from the accessory within the timeout period can be interpreted as a cancellation. In some embodiments, after exiting process 700, the accessory can disconnect from and reconnect to the host in order to restart process 700 and try again.

If, at block 712, the IDInfo command is not rejected, then it is expected that the accessory receives IDAccept at block 722. In that case, identification is successfully completed, and the accessory can begin to interoperate with the host at block 724. Although process 700 can exit, the accessory and the host can remain connected and can begin to interoperate according to the negotiated operating agreement, e.g., using any or all of the operative messages in the proposal the host accepted at block 722. This can include messages in the Message-Send and/or Message-Receive lists described above, as well as any messages that are considered operative by default (e.g., general messages as described above).

In process 700, if the accessory receives neither IDAccept nor IDReject in response to an IDInfo message, this is regarded as an error. (This can also occur in some embodiments if the host sends IDTimeout, either before or after the accessory sends IDInfo.) In this case, the connection can be reset at block 726, and process 700 can return to block 702 to attempt to reestablish the connection and restart the identification process from the beginning Resetting the connection in some embodiments may require physical disconnection of the accessory from the host or other user intervention (e.g., pushing a reset button on the accessory). Block 726 can be reached, for example, if the host does not respond at all within an accessory-determined timeout period or if the response is something other than IDAccept or IDReject.

It will be appreciated that the identification processes of FIGS. 6 and 7 are illustrative and that variations and modifications are possible. Steps described as sequential may be executed in parallel, order of steps may be varied, and steps may be modified, combined, added or omitted. For instance, the authentication process can be started at any time (including prior to the host sending IDStart to the accessory or after the host receives IDInfo) or omitted entirely if desired. Tests by the host to determine whether to accept or reject a particular identification message can be performed in any order, and any number and combination of tests can be used. In some instances, a test result can depend on both the content of the IDInfo message and the authentication information; for example, the ability to send or receive certain messages can be restricted based on the particular digital certificate presented by the accessory.

In instances where identification fails (e.g., a timeout occurs, or the accessory cancels), either the accessory or the host device (or both) can alert the user, depending on implementation. Such alerts can take the form of on-screen notifications, lighting of indicator lights, sounds, etc. The user can then take appropriate action to resolve the failure, such as disconnecting and reconnecting the accessory (e.g., disengaging and reengaging connectors, pressing a reset button, or the like).

As described above, successful completion of identification operations (e.g., processes 600 and 700) places the host and accessory in a state where they are capable of exchanging messages and have negotiated an operating agreement that specifies which messages each device will accept from the other. In some embodiments, the agreement can implicitly include certain messages that are presumed sendable or receivable by all host or accessory devices, e.g., the identification-related messages and/or other general messages as described above.

Well-behaved devices conform to the negotiated operating agreement. Thus, for example, a well-behaved accessory does not send any messages other than those that were on the accepted list of sendable messages and disregards any messages other than those that were on the accepted list of receivable messages. Similarly, a well-behaved host disregards any messages received from the accessory other than those that were on the accepted list of sendable messages and does not send any to the accessory messages other than those that were on the accepted list of receivable messages. Disregarding received messages that were not agreed to can help protect the host (or accessory) against an ill-behaved accessory (or host) that violates the agreement by sending a message the recipient did not agree to receive. This in turn can provide for more reliable interoperation between the devices. It is not required that a well-behaved device (host or accessory) actually does send or receive all of the agreed-upon messages during a particular communication session, only that it be capable of doing so. Whether a particular message is or is not sent may depend on specific circumstances of the operation, including in some instances user interaction.

In some embodiments, as noted above, the accessory can send an IDUpdate message following successful completion of identification (e.g., processes 600 and 700). The IDUpdate message can include new values for one or more parameters that were previously specified using the IDInfo message. As described above, the IDUpdate message can be limited to updating a subset of the parameters in the IDInfo message (e.g., the accessory name but not the message lists). To the extent that the IDUpdate message does not affect the existing operating agreement between the host and device, the host can simply update the relevant information and use the updated information to continue interacting with the accessory.

For example, in some embodiments, the accessory can provide its current language and/or region settings in the IDInfo message as described above. After identification, the host can reply with a message indicating recommended language and/or region settings that may be different from the current settings. (The recommendation can be based on the host device's own settings, on the accessory's current settings and supported languages/regions, on other information such as current location of the host device or the accessory, etc.) If the accessory accepts the recommendation, the accessory can send an IDUpdate message indicating the new current language and/or region setting. In another example, a user may change the language and/or region settings on the accessory by interacting directly with the accessory, and the accessory can send an IDUpdate message to inform the host of the change.

In some embodiments, updates to the accessory's ports and settings can be sent using IDUpdate messages. For example, the accessory may decide to activate a port that was previously identified as not being available for accessory-protocol communication, or to deactivate a port that was previously identified as available. When the accessory activates a port using IDUpdate, the host can apply the previously negotiated operating agreement to the newly activated port. In some embodiments, the accessory cannot use an IDUpdate message to add a port that was not identified using IDInfo but can use an IDUpdate to change settings related to any port that was identified using IDInfo.

If the accessory determines that changes to the operating agreement are needed, the accessory can send an IDCancel message rather than IDUpdate, then reidentify as described above. If the host determines that changes to the operating agreement are needed (e.g., in response to IDUpdate or any other event or occurrence), the host can send a new IDStart message, thereby reinvoking the identification processes.

The express negotiation of an operating agreement (e.g., as described above) can also facilitate forward and backward compatibility between devices implementing older and newer versions of the protocol. For example, as new functionality is added, the protocol can be expanded to include new message IDs. If an accessory using a newer protocol version connects to a host that uses an older version, the accessory may propose message IDs that are not recognized by the host, and the host will reject the identification based on unrecognized message IDs. If the rejection message informs the accessory that there were unrecognized message IDs, the accessory can infer that the host is using an older version of the protocol and can also infer, e.g., that the host does not support the associated functionality or supports a more limited functionality.

Conversely, if an accessory using an older protocol version connects to a host that uses a newer version, the accessory may propose only a subset of the message IDs that the host associates with a particular functionality. Based on the absence of newer message IDs, the host can infer that the accessory is using an older version of the protocol; the host can accept the proposal as long as the host supports the proposed subset of message IDs. In some instances, the host may limit its behavior based on the particular message IDs proposed by the accessory. For example, a current version of the protocol may support providing images from a host to an accessory in three different formats (A, B and C), while an older version supports only two (A and B). The host can determine that images in format C are, in effect, not available for purposes of interoperating with an accessory that only supports A and B.

The express negotiation of an operating agreement (e.g., as described above) can also facilitate certification testing of accessories. For example, a manufacturer of a line of host devices may operate a certification program that allows other manufacturers to submit accessories to be certified as interoperable with the manufacturer's host devices. Under the program, certified accessories can be marked and advertised as being compatible, e.g., using proprietary badging and language. (One example of a certification program is Apple's "Made for iPod®" program.)

During certification testing, the test station (which can be automated or human-operated) can establish an operating agreement with the accessory, then test the accessory using every message the accessory purported to be able to send and/or receive. The test station can also detect whether the accessory is sending any messages not on its list. Certification requirements for an accessory can include verifying that the accessory conforms to the rules for well-behaved accessories described above (e.g., ignoring received messages not on the agreed-upon list and sending only messages that are on the agreed-upon list).

Embodiments described herein can provide robust and flexible techniques for identifying accessories to host devices and establishing an operating agreement between a host and an accessory. The accessory presents, at the outset, information identifying all the capabilities it might use while connected to the host device, and the host can determine whether to accept or reject the accessory identification (thereby allowing or disallowing interoperation) based on the totality of that information.

These techniques can be used, for example, in a context where a host is capable of interoperating with a number of different accessories having different capabilities to implement a broad range of accessory-dependent functionalities and where a common protocol defines a universe of messages that can support a range of accessories having different capabilities interoperating with hosts whose capabilities may also vary. A particular host and a particular accessory can use the techniques described above to verify, prior to attempting to communicate in a particular manner (e.g., with a particular set of messages), that the other device is capable of communicating in that manner. Further, older and newer devices can still be made to interoperate by having them negotiate a set of messages that they can exchange. Thus, for example, when a particular accessory connects to a particular host, the accessory can present to the host, e.g., using an identification message, a proposal to partition the universe of messages defined by the protocol into an "operative" subset of messages (i.e., messages that the particular host and the particular accessory mutually agree to use to communicate with each other) and an "inoperative" subset (i.e., messages defined by the protocol that are not in the operative subset). In certain embodiments described above, the proposal is presented using a list of specific messages that are proposed for inclusion in the operative subset; as noted above, the operative subset can also include certain messages by default (e.g., general messages in examples described above) in addition to any expressly listed messages. The host can determine whether the proposed partition is acceptable and inform the accessory of its decision to accept or reject the proposal.

Expressly identifying particular messages that can be exchanged, rather than identifying a group of messages or broad category of functionality to be supported, can be less unwieldy than managing multiple versions at the level of message groups or categories of functionality and can expand the possibilities for interoperation to a larger range of devices. Further, where messages can be extended by adding parameters, identifying particular messages can be made at least somewhat future-proof as long as devices that receive messages with unrecognized behavior treat them appropriately (e.g., ignoring them rather than generating an error message to the sender) and provided that any parameters added to the definition of a message after its inception have assigned default values so that a device that uses a later-added parameter can act accordingly in the absence of a specified value.

While the invention has been described with respect to specific embodiments, one skilled in the art will recognize that numerous modifications are possible and that features described with specific reference to one embodiment can be applied in other embodiments. In some embodiments, not every accessory that can be connected to a host is required to identify itself; successful identification can be a prerequisite for any further communication using the accessory protocol, but other (limited) functionality can be supported outside of the accessory protocol. For example, a charger may be able to provide power to the host device without sending any identification or authentication messages. As another example, the host device may have ports that do not implement the accessory protocol (e.g., an analog audio-out port such as a headphone jack), and identification would not be required for such ports.

In some embodiments, if a proposed identification is rejected, an accessory that chooses to retry is not required to resend all of its parameters (unless the accessory cancels the process or disconnects). The accessory can be required to resend complete message lists rather than amendments to previous lists, as well as any other parameters that the accessory determines should be changed. Requiring the accessory to present a single complete message list (or two separate lists, one for all messages sent and one for all messages received) can facilitate the host device's consideration of the revised proposal and can be simpler than implementing a series of instructions to remove individual messages from and/or add individual messages to a previously presented list.

In some embodiments, while identification is in progress, the accessory can be blocked from sending any messages not related to identification. For example, the host can ignore any such messages that may be received. In other embodiments, the host can provisionally allow at least some unrelated messages during the identification process (e.g., by receiving and acting on them) and begin to block or ignore messages after identification if the process ended in failure or if the messages are not within the scope of the negotiated operating agreement. Likewise, in some embodiments the accessory can choose whether to ignore or process messages unrelated to identification that may be received during the identification process.

Further, while the description above refers to an accessory identifying itself to a host device, those skilled in the art with access to the present teachings will recognize that the roles can be reversed. Similar messages and processes can be implemented to allow a host to identify itself to an accessory and negotiate an operating agreement based on particular messages to be supported. Bidirectional identification can also be implemented, e.g., with one device presenting information about itself and the other device responding with its own information. In any particular implementation, the negotiation of an acceptable set of messages to be exchanged can happen in either direction (e.g., either accessory proposes/host accepts or rejects, as described above, or in the reverse direction, with host proposing and accessory accepting or rejecting). Other embodiments may define an iterative negotiation process in which one device can receive a proposal from the other device, modify a portion of the proposal that is not accepted, and send a modified proposal to the other device for consideration; upon receipt of a modified proposal, the other device can either accept the modified proposal or make further modifications, and the process can continue until a proposal sent by either device is accepted by the other.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for establishing communication between a first device and a second device according to a protocol that defines a universe of messages that are sendable by one of the first device and the second device to the other of the first device and the second device, the method comprising:

sending, by the first device, an identification message to the second device, wherein the identification message includes a proposal that partitions the universe of messages into a set of operative messages and a set of inoperative messages and wherein the proposal includes a listing of at least some of the messages in the universe of messages to be included in the set of operative messages, the listing including a first list identifying a first subset of the messages in the universe of messages defined by the protocol that the first device proposes to send to the second device and a second list identifying a second subset of messages in the universe of messages defined by the protocol that the first device proposes to receive from the second device;

in response to sending the identification message, receiving, by the first device, a response message from the second device, the response message indicating whether the proposal was accepted or rejected by the second device; and in the event that the proposal was accepted, using, by the first device, at least some of the messages from the first subset and the second subset to interoperate with the second device.

2. The method of claim 1 further comprising:
in the event that the status information indicates that the proposal was rejected, sending, by the first device, a modified proposal to the second device, the modified proposal including a modification to the listing of messages to be included in the set of operative messages.

3. The method of claim 1 further comprising:
receiving, by the first device, an identification request from the second device,
wherein the identification message is sent in response to receiving the identification request.

4. The method of claim 1 wherein the identification message further includes a device descriptor, the device descriptor including at least one of a name of a manufacturer of the first device, a model name of the first device, a serial number of the first device, a hardware version identifier of the first device, or a firmware version identifier of the first device.

5. A method for establishing communication between a first device and a second device according to a protocol that defines a universe of messages that are sendable by one of the first device and the second device to the other of the first device and the second device, the method comprising:

receiving, by the second device, an identification message from the first device, wherein the identification message includes a proposal that partitions the universe of messages into a set of operative messages and a set of inoperative messages and wherein the proposal includes a listing of at least some of the messages in the universe of messages to be included in the set of operative messages, the listing a first list identifying a first subset of the messages in the universe of messages defined by the protocol that the first device proposes to send to the second device and a second list identifying a second subset of messages in the universe of messages defined by the protocol that the first device proposes to receive from the second device;

determining, by the second device, whether to accept or reject the proposal;

sending, by the second device, a response message to the first device, wherein the response message indicates whether the proposal is accepted or rejected; and in the event that the second device accepts the proposal, using, by the second device, messages from the first subset and the second subset to interoperate with the first device.

6. The method of claim 5 further comprising:
receiving, by the second device, authentication information from the first device,
wherein determining whether to accept the proposal is based at least in part on the received authentication information.

7. The method of claim 5 wherein determining whether to accept the proposal is based in part on determining whether the second device is capable of responding to every one of the messages in the first subset and in part on determining whether the second device is capable of sending every one of the messages in the second subset.

8. The method of claim 5 wherein determining whether to accept the proposal is based in part on determining whether the first subset and the second subset include a sufficient subset of messages to implement a functionality associated with at least one of the messages in at least one of the first subset or the second subset.

9. The method of claim 5 wherein the identification message further includes a device descriptor and wherein determining whether to accept the proposal includes determining whether the messages in the first subset and the messages in the second subset are permissible based on the device descriptor.

10. The method of claim 5 wherein the universe of messages consists of a set of general messages and a set of optional messages, wherein the listing of messages in the proposal further includes all of the messages in the set of optional messages that are to be included in the set of operative messages.

11. An accessory for use with a host device, the accessory comprising:
an interface circuit to communicate with the host device; and
a control logic circuit coupled to the interface circuit, the control logic circuit to:
establish a connection to the host device via the interface circuit; generate a proposal for interoperation of the accessory with the host device according to a protocol that defines a universe of messages, wherein the proposal partitions the universe of messages into a set of operative messages and a set of inoperative messages and wherein the proposal includes a listing of at least some of the messages in the universe of messages to be included in the set of operative messages, the listing including a first list identifying a first subset of the messages in the universe of messages defined by the protocol that the accessory proposes to send to the host device; and a second list identifying a second subset of messages in the universe of messages defined by the protocol that the accessory proposes to receive from the host device;
send the proposal to the host device via the interface circuit;
receive a response from the host device via the interface circuit, wherein the response indicates whether the host device accepted or rejected the proposal; and
initiate interoperation with the host device in the event that the response indicates that the host device accepted the proposal, wherein the interoperation with the host device includes exchanging messages in the set of operative messages and ignoring messages in the set of inoperative messages.

12. The accessory of claim 11 wherein the universe of messages consists of a set of general messages and a set of optional messages, wherein the listing of messages in the proposal further includes all of the messages in the set of optional messages that are to be included in the set of operative messages.

13. The accessory of claim 12 wherein all of the messages in the set of general messages are included in the set of operative messages but are not included in the listing in the proposal.

14. The accessory of claim 11 wherein the control logic circuit further:
generates a modified proposal in the event that the response indicates that the host device rejected the proposal; and sends the modified proposal to the host device via the interface circuit.

15. The accessory of claim 11 further comprising:
in the event that the status information indicates that the proposal was rejected, sending, by the accessory, a modified proposal to the host device, the modified proposal including a modification to the listing of messages to be included in the set of operative messages.

16. A host device for use with an accessory, the host device comprising:
an interface circuit to communicate with the accessory; and
a control logic circuit coupled to the interface circuit, the control logic circuit to:
detect a connection to the accessory via the interface circuit;
receive, from the accessory via the interface circuit, a proposal for interoperation of the accessory with the host device according to a protocol that defines a universe of messages, wherein the proposal partitions the universe of messages into a set of operative messages and a set of inoperative messages and wherein the proposal includes a listing of at least some of the messages in the universe of messages to be included in the set of operative messages, the listing including a first list identifying a first subset of the messages in the universe of messages defined by the protocol that the accessory proposes to send to the host device; and a second list identifying a second subset of messages in the universe of messages defined by the protocol that the accessory proposes to receive from the host device;
determine whether to accept or reject the proposal;
send a response, to the accessory via the interface circuit, wherein the response indicates whether the host device accepted or rejected the proposal; and
initiate interoperation with the accessory in the event that the host device accepts the proposal, wherein the interoperation with the accessory includes exchanging messages in the set of operative messages and ignoring messages in the set of inoperative messages.

17. The host device of claim 16 wherein the universe of messages consists of a set of general messages and a set of optional messages, wherein the listing of messages in the proposal further includes all of the messages in the set of optional messages that are to be included in the set of operative messages.

18. The host device of claim 16 wherein the control logic circuit determines whether to accept the proposal based in part on determining whether the host device is capable of responding to every one of the messages in the first subset and in part on determining whether the host device is capable of sending every one of the messages in the second subset.

19. The host device of claim 16 wherein the control logic circuit further determines whether to accept the proposal based in part on determining whether the first subset and the second subset include a sufficient subset of messages to implement a functionality associated with at least one of the messages in at least one of the first subset or the second subset.

20. The host device of claim 16 wherein the proposal for interoperation further includes a device descriptor and wherein the control logic circuit further determines whether to accept the proposal based in part on determining whether the messages in the first subset and the messages in the second subset are permissible based on the device descriptor.

21. The host device of claim 16 wherein the control logic circuit further:

waits for a timeout period to elapse, subsequently to sending a response indicating that the host device rejected the proposal;
in the event that a modified proposal is received during the timeout period, determines whether to accept or reject the modified proposal and send a further response to the accessory, via the interface circuit, to indicate whether the host device accepted or rejected the modified proposal; and
in the event that no modified proposal is received during the timeout period, sends a timeout message to the accessory via the interface circuit and ignores further messages from the accessory after sending the timeout message.

22. A non-transitory computer readable storage medium having program code stored thereon, the program code including instructions that, when executed by a processor in a host device, cause the processor to execute a method comprising:
detecting a connection to an accessory via an interface;
sending, to the accessory via the interface, a request for identification;
receiving, from the accessory via the interface, a proposal for interoperation of the accessory with the host device according to a protocol that defines a universe of messages exchangeable between the host device and the accessory device, wherein the proposal partitions the universe of messages into a set of operative messages and a set of inoperative messages and wherein the proposal includes a listing of at least some of the messages in the universe of messages to be included in the set of operative messages, the listing including a first list identifying a first subset of the messages in the universe of messages defined by the protocol that the accessory proposes to send to the host device; and a second list identifying a second subset of messages in the universe of messages defined by the protocol that the accessory proposes to receive from the host device;
determining whether to accept or reject the proposal;
sending a response, to the accessory via the interface, wherein the response indicates whether the host device accepts or rejects the proposal; and
in the event that the host device accepts the proposal, interoperating with the accessory, wherein interoperating includes exchanging only messages that are in the set of operative messages defined by the accepted proposal.

23. The computer readable storage medium of claim 22 wherein interoperating with the accessory includes:
receiving a first message from the accessory;
determining whether the first message was included in the accepted proposal;
acting on the first message if the first message was included in the accepted proposal; and
ignoring the first message if the first message was not included in the accepted proposal.

24. The computer readable storage medium of claim 22 wherein the method further comprises:
receiving authentication information from the accessory, wherein determining whether to accept or reject the proposal is based at least in part on the received authentication information.

25. The computer readable storage medium of claim 22 wherein the method further comprises:
inferring from the proposal a capability of the accessory; and determining whether the list of message identifiers includes a group of messages sufficient to interoperate with the inferred capability of the accessory, wherein the proposal is rejected if the list of message identifiers does not include a group of messages sufficient to interoperate with the inferred capability of the accessory.

* * * * *